(12) United States Patent
Park et al.

(10) Patent No.: US 9,910,201 B2
(45) Date of Patent: *Mar. 6, 2018

(54) METHOD OF MANUFACTURING MOTHER SUBSTRATE ASSEMBLY

(71) Applicant: SAMSUNG DISPLAY CO., LTD., Yongin-si, Gyeonggi-do (KR)

(72) Inventors: Seung-Won Park, Seoul (KR); Taewoo Kim, Seoul (KR); Moongyu Lee, Suwon-si (KR); Minhyuck Kang, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,702

(22) Filed: Aug. 22, 2016

(65) Prior Publication Data

US 2016/0356935 A1 Dec. 8, 2016

Related U.S. Application Data

(63) Continuation of application No. 14/513,965, filed on Oct. 14, 2014, now Pat. No. 9,423,541.

(30) Foreign Application Priority Data

Jan. 28, 2014 (KR) .................. 10-2014-0010631

(51) Int. Cl.
*H01L 21/00* (2006.01)
*G02B 5/30* (2006.01)
(Continued)

(52) U.S. Cl.
CPC ............. *G02B 5/3058* (2013.01); *G02B 1/12* (2013.01); *G02F 1/133536* (2013.01); *G02F 2001/133548* (2013.01)

(58) Field of Classification Search
CPC ......... H01L 21/31144; H01L 21/76897; H01L 21/0337; H01L 21/76816; H01L 21/76877;
(Continued)

(56) References Cited

U.S. PATENT DOCUMENTS

2010/0151393 A1 6/2010 Kim et al.
2010/0193912 A1* 8/2010 Speakman ................ G03F 1/56
257/618
2015/0212239 A1 7/2015 Park et al.

FOREIGN PATENT DOCUMENTS

KR 1020090028246 3/2009
KR 1020100080336 7/2010
(Continued)

*Primary Examiner* — Julio J Maldonado
*Assistant Examiner* — Rodolfo D Fortich
(74) *Attorney, Agent, or Firm* — F. Chau & Associates, LLC

(57) ABSTRACT

A manufacturing method of a mother substrate assembly includes forming a metal layer on substantially an entire surface of a transparent substrate including a cell area including a non-display area and a display area, an align key area, and a substrate area surrounding the cell area and the align key area, etching the metal layer to form an align key in the align key area, etching the metal layer to form a reflection part in the non-display area, and etching the metal layer in the display area to form a metal nanowire in the display area.

15 Claims, 31 Drawing Sheets

(51) Int. Cl.
*G02B 1/12* (2006.01)
*G02F 1/1335* (2006.01)

(58) Field of Classification Search
CPC ......... H01L 21/32139; H01L 21/76802; H01L 21/0274; H01L 21/0276; H01L 21/0332; H01L 21/76805
USPC ........................................................ 438/283
See application file for complete search history.

(56) References Cited

FOREIGN PATENT DOCUMENTS

| KR | 10-20110101893 | 9/2011 |
|---|---|---|
| KR | 10-2012-0126951 | 11/2012 |
| KR | 1020140137734 | 12/2014 |

\* cited by examiner

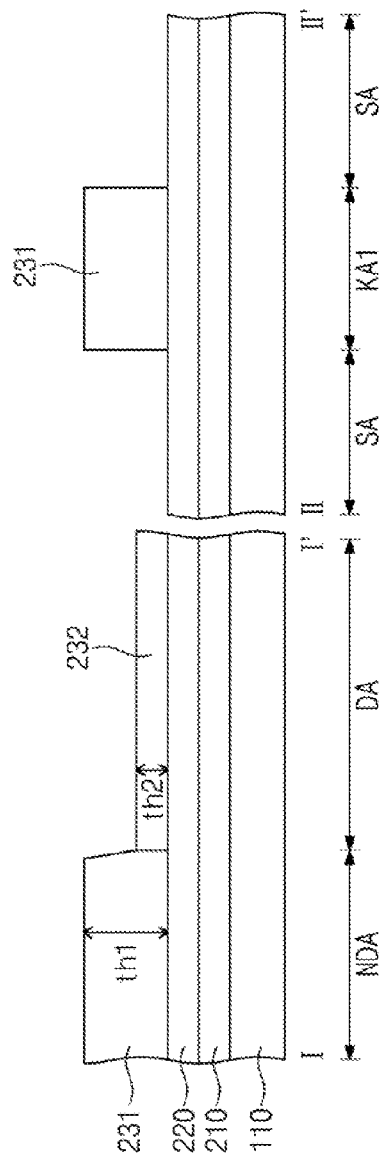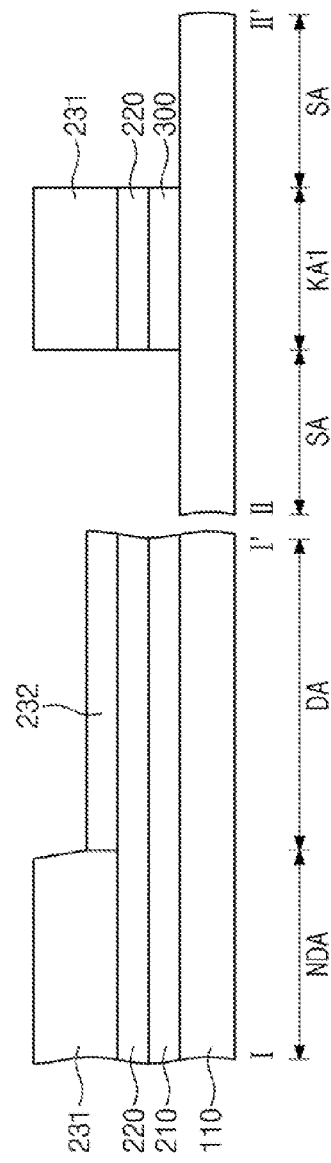

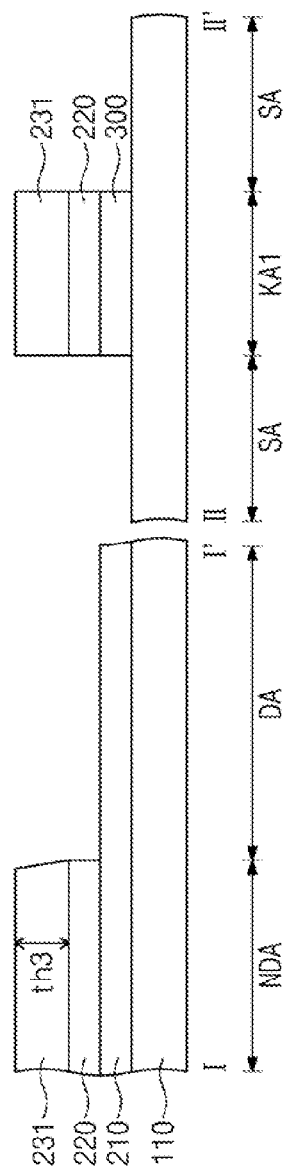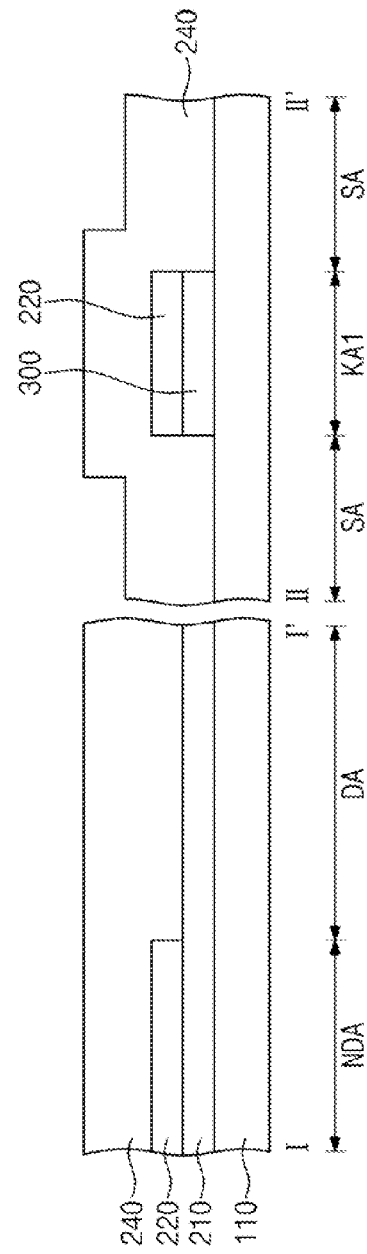

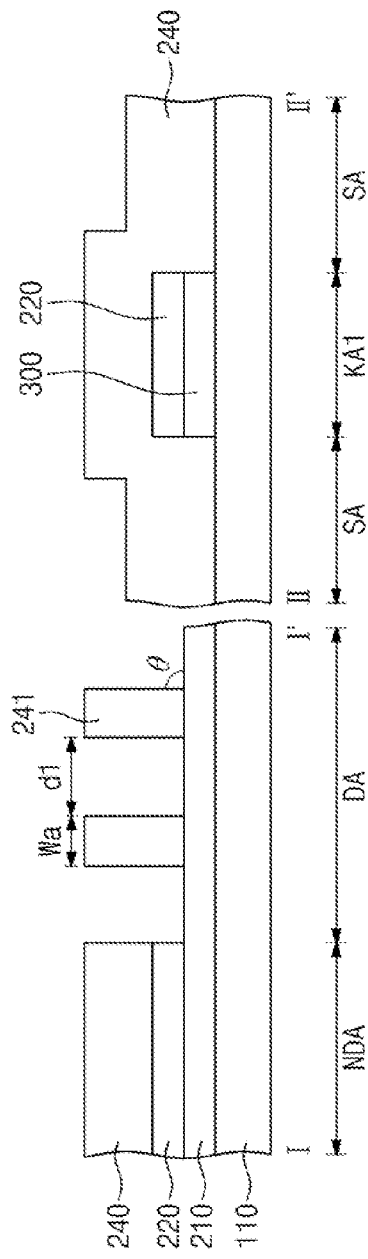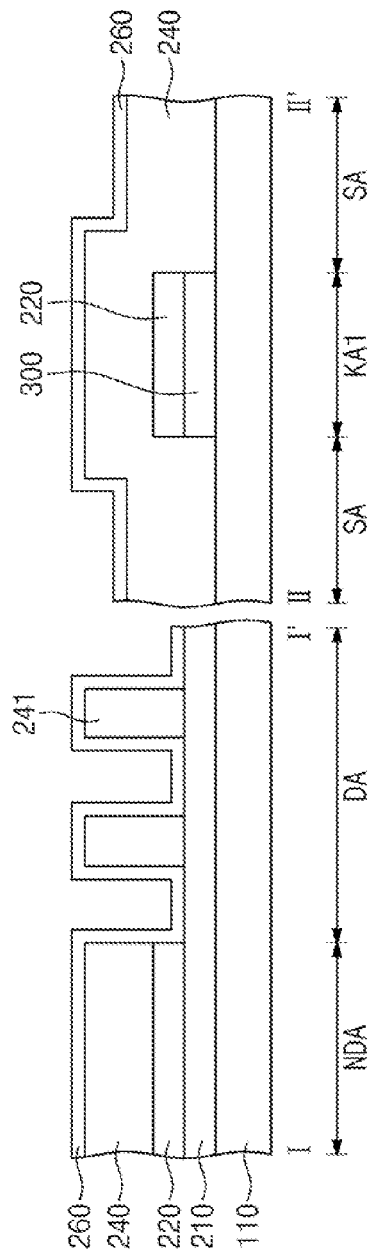

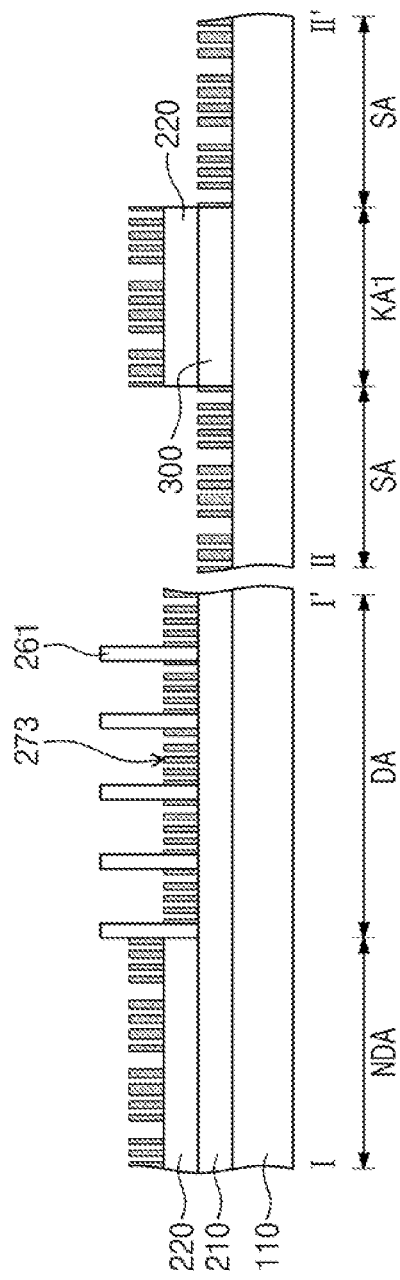

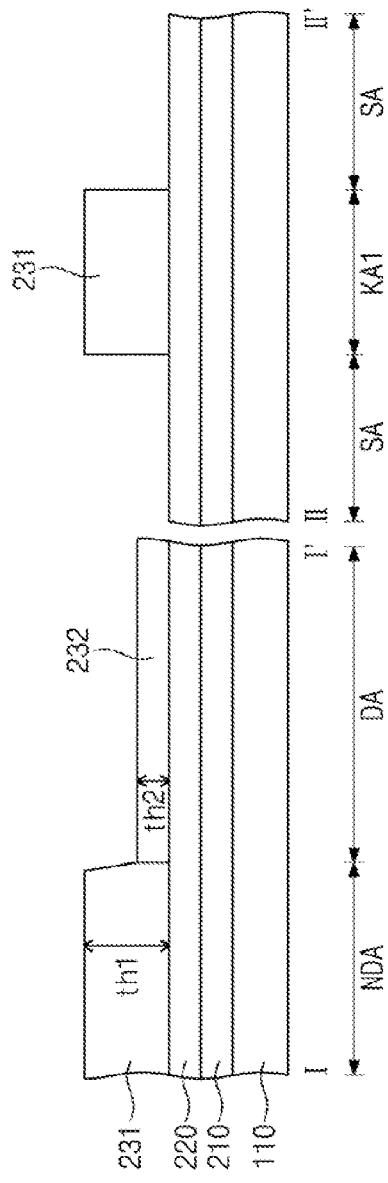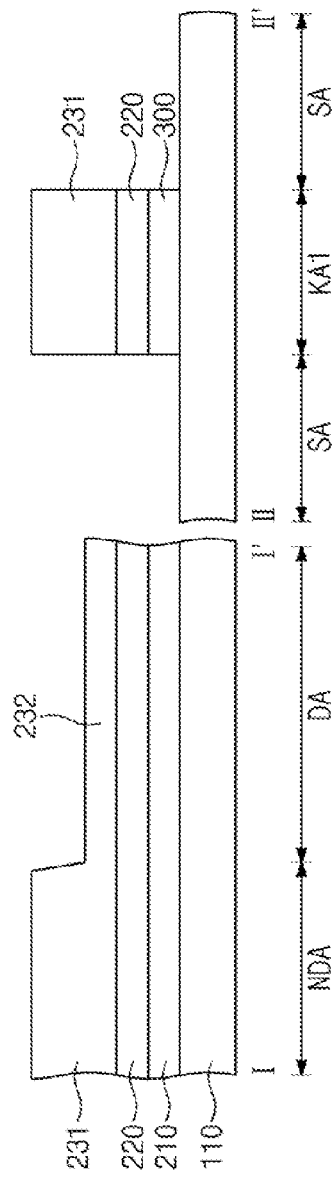

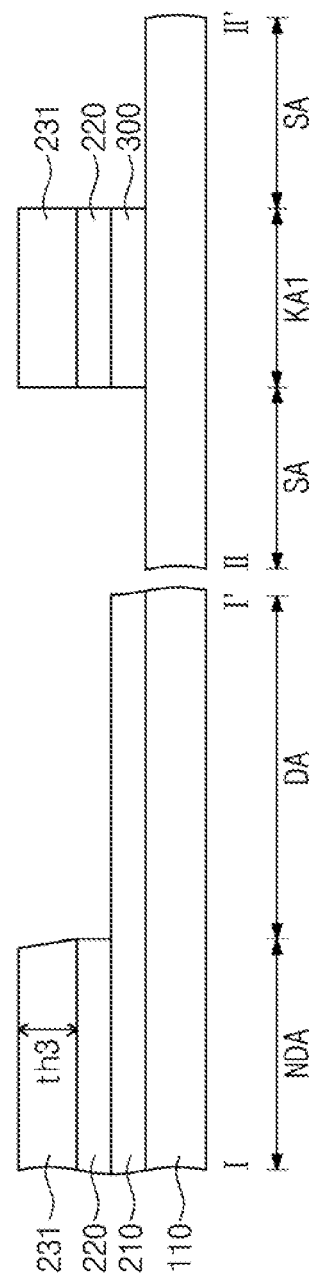

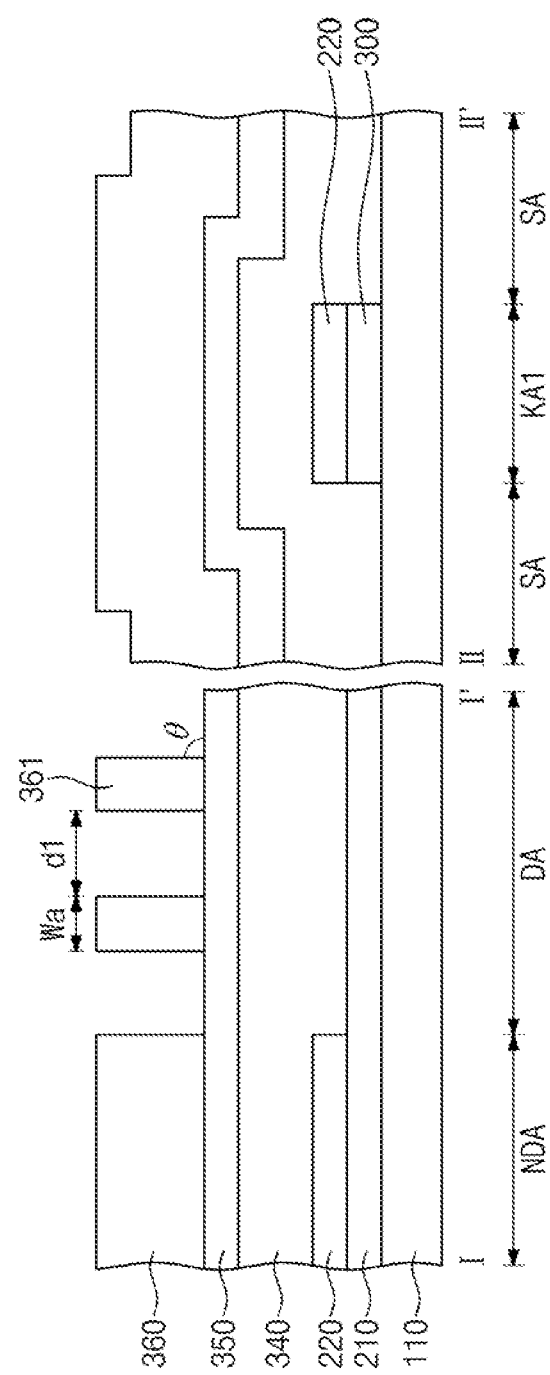

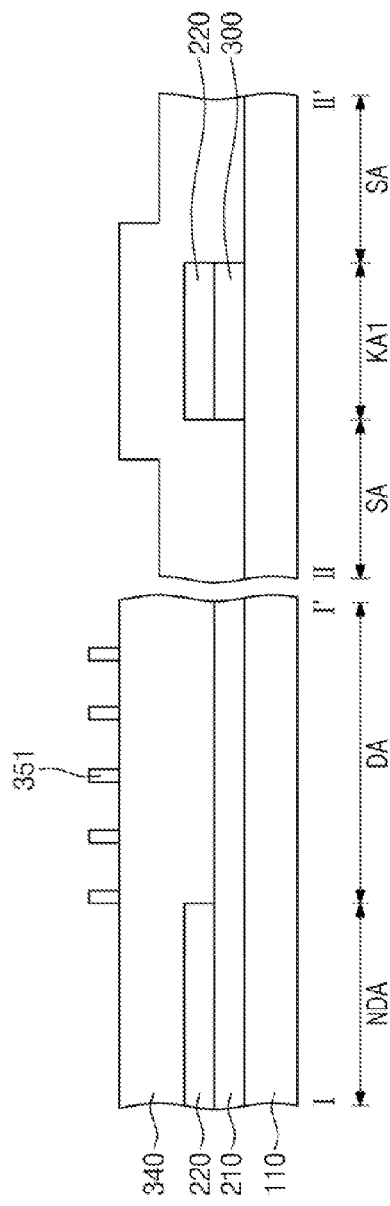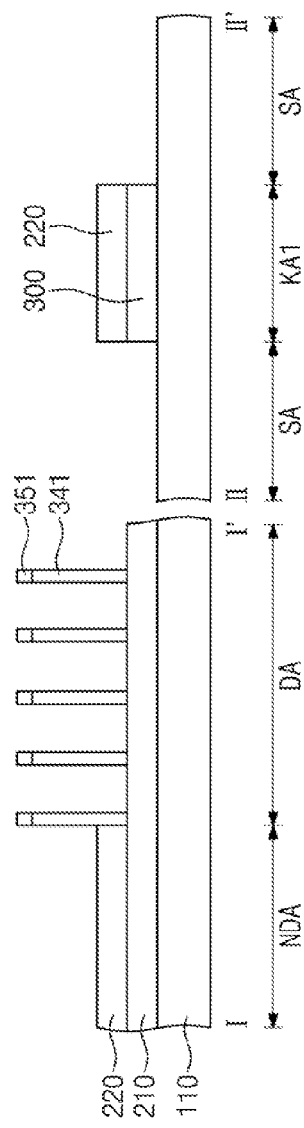

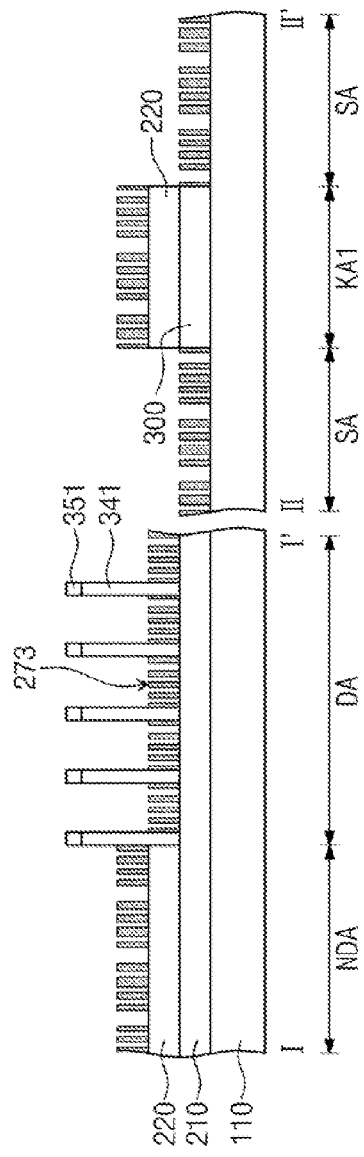
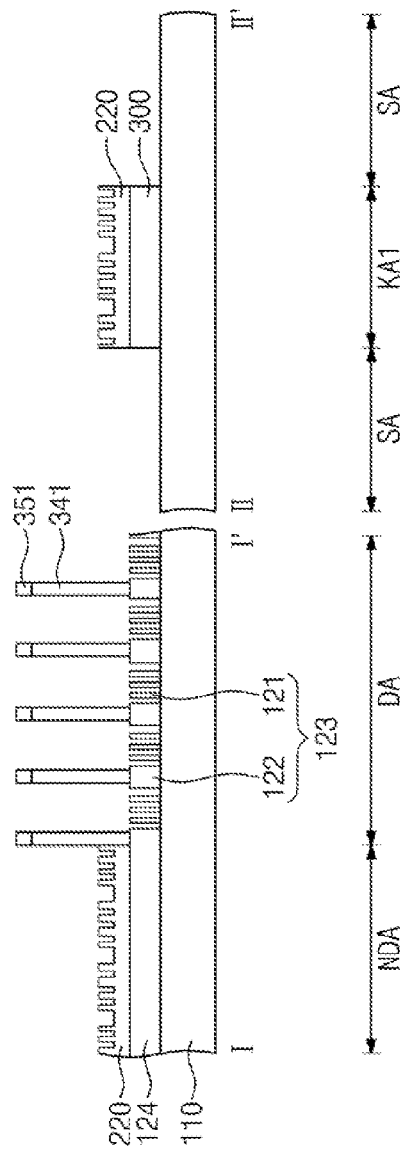

METHOD OF MANUFACTURING MOTHER SUBSTRATE ASSEMBLY

CROSS-REFERENCE TO RELATED APPLICATION

This application is a Continuation of Co-Pending U.S. patent application Ser. No. 14/513,965, filed on Oct. 14, 2014, which claims priority under 35 U.S.C. § 119 to Korean Patent Application No. 10-2014-0010631, filed on Jan. 28, 2014, the disclosures of which are hereby incorporated by reference herein in their entirety.

1. Technical Field

The present disclosure relates to a method of manufacturing a mother substrate assembly. More particularly, the present disclosure relates to a manufacturing method of a mother substrate assembly including an in-cell reflective polarizer.

2. Discussion of the Related Art

In general, metal wires spaced apart from each other selectively transmit or reflect an electromagnetic wave. That is, when an arrangement period of the metal wires is shorter than a wavelength of the electromagnetic wave incident thereto, a polarizing component parallel to the metal wires may be reflected by the metal wires and a polarizing component vertical to the metal wires transmits through the metal wires.

A polarizer having beneficial polarizing efficiency, high transmittance, and wide viewing angle is manufactured by using the above-mentioned phenomenon. This polarizer is called a wire grid polarizer.

In recent years, the wire grid polarizer has been applied to display devices.

SUMMARY

Exemplary embodiments of the present invention provide a method of manufacturing a mother substrate assembly, which is able to reduce the number of masks used to manufacture the mother substrate assembly.

Embodiments of the present invention provide a method of manufacturing a mother substrate assembly, including forming a metal layer on substantially an entire surface of a transparent substrate including a cell area including a non-display area and a display area, an align key area, and a substrate area surrounding the cell area and the align key area, forming an etch stop layer on substantially an entire surface of the metal layer, forming a photoresist layer on substantially an entire surface of the etch stop layer, exposing the photoresist layer to a light using a first mask, with the photoresist layer being fully exposed in the substrate area and under-exposed in the display area and the light being blocked in the non-display area and the align key area, developing the photoresist layer to form a main photoresist layer and a sub-photoresist layer, which have different heights from each other, and to expose an upper surface to the outside in the substrate area, removing the etch stop layer and the metal layer in the substrate area to form an align key in the align key area, removing the sub-photoresist layer to expose an upper surface of the etch stop layer in the display area, removing the etch stop layer in the display area, removing the main photoresist layer from the non-display area and the align key area, and etching the metal layer in the display area to form a metal nano-wire.

The first mask includes a first area corresponding to the substrate area, a second area corresponding to the display area, and a third area corresponding to the non-display area and the align key area, the first area has a first transmittance higher than a second transmittance of the second area, and the second transmittance is higher than a third transmittance of the third area.

The first mask is a halftone mask, a slit mask, or a binary mask.

The main photoresist layer has a first thickness and the sub-photoresist layer has a second thickness smaller than the first thickness.

The forming of the metal nanowire includes forming a sacrificial layer on the etch stop layer, the metal layer, and the transparent substrate, patterning the sacrificial layer in the display area using a second mask to form a bar pattern, forming a barrier layer on the bar pattern and the sacrificial layer, performing an anisotropic etching process on the barrier layer to form barrier walls disposed along a sidewall of the bar pattern and spaced apart from each other at predetermined intervals, removing the bar pattern, providing a copolymer layer including first and second polymers to opening portions between the barrier walls and to the non-display area, heat-treating or solvent-annealing the copolymer layer to alternately arrange the first and second polymers in the display area, removing the second polymer to form a plurality of protruding bars formed of the first polymer and spaced apart from each other between the barrier walls, and etching the metal layer using the barrier walls and the protruding bars as a mask.

The sacrificial layer and the barrier layer includes a material having an etch selectivity different from an etch selectivity of the metal layer.

The etch selectivity of the sacrificial layer is greater than the etch selectivity of the barrier layer.

The sacrificial layer includes silicon nitride and the barrier layer includes silicon oxide.

The barrier layer has a height greater than a height of the copolymer layer.

The sidewall of the bar pattern has an inclination angle from about 80 degrees to about 95 degrees.

The anisotropic etching process is performed along a direction vertical to a surface of the transparent substrate.

The forming of the metal nanowire includes forming a first barrier layer on a first metal layer, forming a hard mask layer on the first barrier layer, forming a sacrificial layer on the hard mask layer, patterning the sacrificial layer in the display area using a second mask to form a bar pattern, forming a second barrier layer on the bar pattern and the hard mask layer, performing an anisotropic etching process on the second barrier layer to form first barrier walls disposed along a sidewall of the bar pattern and spaced apart from each other at predetermined intervals, removing the bar pattern, etching the hard mask layer using the first barrier walls as a mask to form second barrier walls, etching the first barrier layer using the second barrier walls as a mask to form third barrier walls, providing a copolymer layer including first and second polymers to opening portions between the third barrier walls, heat-treating or solvent-annealing the copolymer layer to alternately arrange the first and second polymers in the display area, removing the second polymer to form a plurality of protruding bars formed of the first polymer and spaced apart from each other between the third barrier walls, and etching the metal layer using the third barrier walls and the protruding bars as a mask.

The sacrificial layer and the second barrier layer include a material having an etch selectivity different from an etch selectivity of the hard mask layer.

The etch selectivity of the sacrificial layer is greater than the etch selectivity of the second barrier layer and the hard mask layer has the etch selectivity greater than an etch selectivity of the second barrier layer and first barrier layer has the etch selectivity greater than an etch selectivity of the hard mask layer.

The sacrificial layer and the first barrier layer include silicon nitride, the hard mask layer includes aluminum, and the second barrier layer includes silicon oxide.

The third barrier layer has a height greater than a height of the copolymer.

The etch stop layer includes chromium, copper, titanium or indium tin oxide.

Embodiments of the present invention provide a method of manufacturing a mother substrate assembly, including forming a metal layer on substantially an entire surface of a transparent substrate including a cell area including a non-display area and a display area, an align key area, and a substrate area surrounding the cell area and the align key area, etching the metal layer to form an align key in the align key area, etching the metal layer to form a reflection part in the non-display area, and etching the metal layer in the display area to form a metal nanowire in the display area.

The forming of the align key includes etching the metal layer in the substrate area.

The forming of the align key includes etching the metal layer in the align key area.

According to an exemplary embodiment of the present invention, a method of manufacturing a mother substrate assembly is provided. The method includes forming a metal layer on substantially an entire surface of a transparent substrate including a cell area including a non-display area and a display area, an align key area, and a substrate area surrounding the cell area and the align key area, forming an etch stop layer on substantially an entire surface of the metal layer, forming a photoresist layer having a first thickness on substantially an entire surface of the etch stop layer and exposing the photoresist layer to a light using a first mask such that the photoresist layer is fully exposed in the substrate area and under-exposed in the display area with the light being blocked in the non-display area and the align key area. The first mask includes a mask substrate, a light blocking part, a plurality of slit parts, a first area corresponding to the substrate area, a second area corresponding to the display area and a third area corresponding to the non-display area and the align key area. The light blocking parts are disposed on the mask substrate to correspond to the third area and the slit parts are disposed on the mask substrate to correspond to the second area, and the slit parts include a plurality of slit bars disposed spaced apart from each other and a plurality of slits defined by a space in-between the slit bars.

In addition, the method further includes developing the photoresist layer to form a main photoresist layer having the first thickness in the non-display area and the align key area and a sub-photoresist layer in the display area having a second thickness less than the first thickness of the main photoresist layer, and to expose an upper surface of the etch stop layer in the substrate area, removing the etch stop layer and the metal layer in the substrate area to form an align key in the align key area, etching the sub-photoresist layer and the etch stop layer such that the sub-photoresist layer and the etch stop layer are removed in the display area, etching the main photoresist layer such that the etched main photoresist layer has a third thickness which is less than the first thickness, removing the etched main photoresist layer from the non-display area and the align key area using a stripping process, forming a plurality of barrier walls on the metal layer in the display area, providing a copolymer layer including a first polymer and a second polymer to opening portions between the barrier walls and to the non-display area, heat-treating or solvent-annealing the copolymer layer to alternately arrange the first and second polymers in the display area, removing one of the first polymer or the second polymer to form a nano-grid pattern including a plurality of protruding bars formed from the first polymer or second polymer and spaced apart from each other between the barrier walls, and etching the metal layer using the barrier walls and the nano-grid pattern in the display area as a mask to form a plurality of metal nano-wires which are uniformly disposed on the transparent substrate in the display area.

The first polymer is removed and the second polymer remains between the barrier walls in the display area to form the nano-grid pattern.

The first polymer and the second polymer includes block copolymer.

The first polymer includes polystyrene (PS) and the second polymer includes polymethylmethacrylate (PMMA).

According to above-mentioned exemplary embodiments, the in-cell reflective polarizer and the align key are substantially simultaneously formed using one mask. Thus, the mother substrate assembly may be manufactured without performing a separate mask process for the align key. As a result, the number of the masks used to manufacture the mother substrate assembly may be reduced.

BRIEF DESCRIPTION OF THE DRAWINGS

Exemplary embodiments of the present invention will become readily apparent by reference to the following detailed description when considered in conjunction with the accompanying drawings in which.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be explained in detail with reference to the accompanying drawings.

Figure 1:
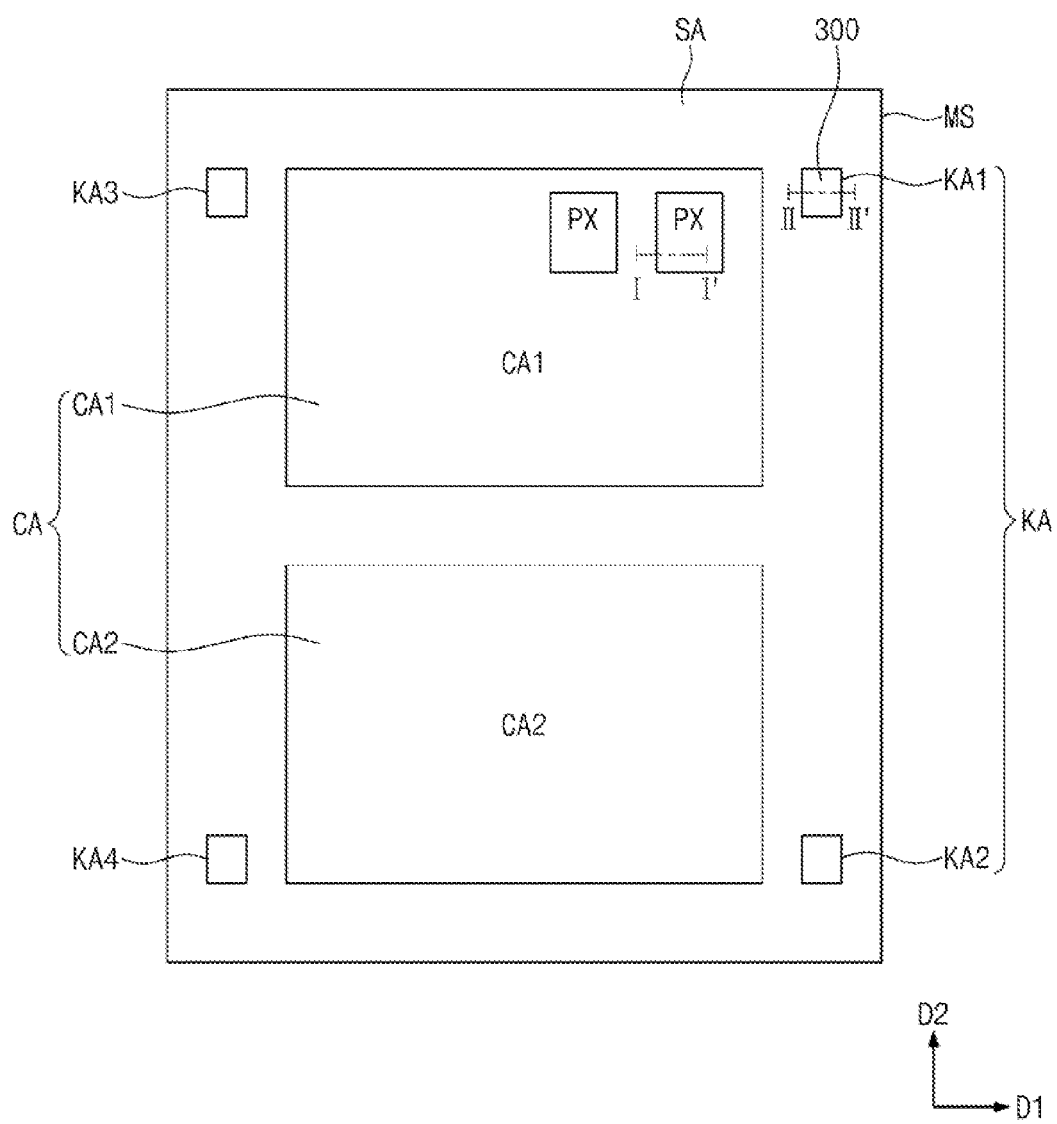
FIG. 1 is a plan view showing a mother substrate assembly according to an exemplary embodiment of the present invention.

FIG. 1 is a plan view showing a mother substrate assembly according to an exemplary embodiment of the present invention.

Referring to FIG. 1, the mother substrate assembly MS includes a cell area CA, an align key area KA, and a substrate area SA.

The mother substrate assembly MS has, for example, a rectangular shape defined by a pair of sides substantially in parallel to a first direction D1 and another pair of sides substantially in parallel to a second direction D2 vertical to the first direction D1.

The cell area CA is provided in a plural number. For instance, the cell area CA includes first and second cell areas CA1 and CA2. The first and second cell areas CA1 and CA2 are sequentially arranged in the mother substrate assembly MS along the first or the second direction D2. Each of the first and second cell areas CA1 and CA2 has, for example, a rectangular shape. A display cell 100 (refer to FIG. 2) is disposed in each of the first and second cell areas CA1 and CA2. The display cell 100 includes a plurality of pixels PX to display an image.

The align key area KA includes, for example, first, second, third, and fourth align key areas KA1, KA2, KA3, and KA4.

The first align key area KA1 is disposed between the first cell area CA1 and a right side end portion extending in the second direction D2 of the mother substrate assembly MS. The second align key area KA2 is disposed between the second cell area CA2 and the right side end portion in the second direction D2 of the mother substrate assembly MS.

The third align key area KA3 is disposed between the first cell area CA1 and a left side end portion extending in the second direction D2 of the mother substrate assembly MS. The fourth align key area KA4 is disposed between the second cell area CA2 and the left side end portion in the second direction D2 of the mother substrate assembly MS.

An align key 300 is disposed in each of the first to fourth align key areas KA1 to KA4. The substrate area SA surrounds the first and second cell areas CA1 and CA2 and the first to fourth align key areas KA1 to KA4.

The mother substrate assembly MS is cut along a boundary between the first and second cell areas CA1 and CA2. Accordingly, the display cell 100 is separated from the mother substrate assembly MS, and the substrate area SA and the first to fourth align key areas KA1 to KA4 remain in the mother substrate assembly MS. Then, the separated display cell 100 becomes a display panel, and the display panel is assembled to a printed circuit board that controls the display panel and a backlight unit that is configured to provide light to the display panel to form a liquid crystal display.

Figure 2:
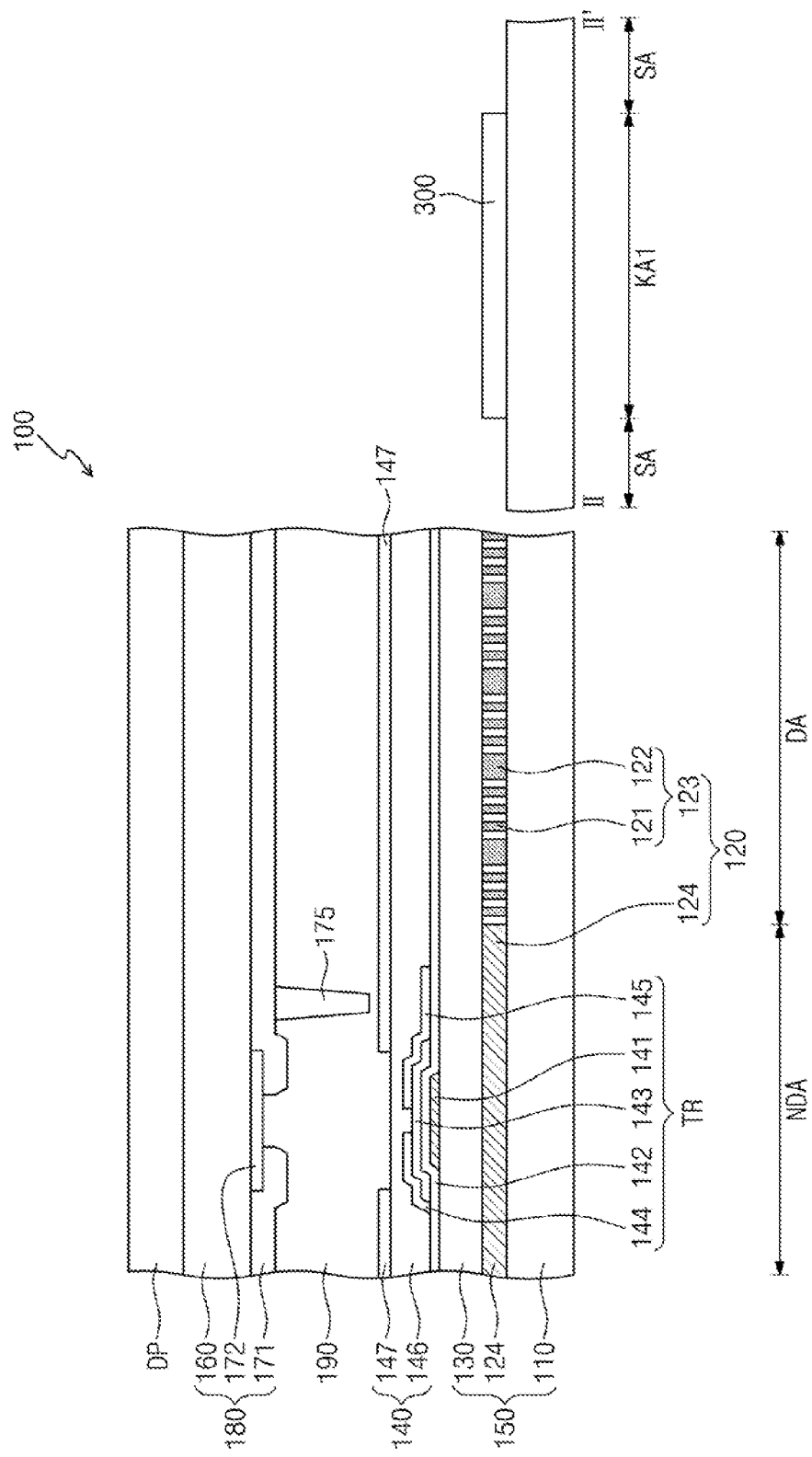
FIG. 2 is a cross-sectional view taken along lines I-I' and II-II' shown in FIG. 2.
Figure 3:
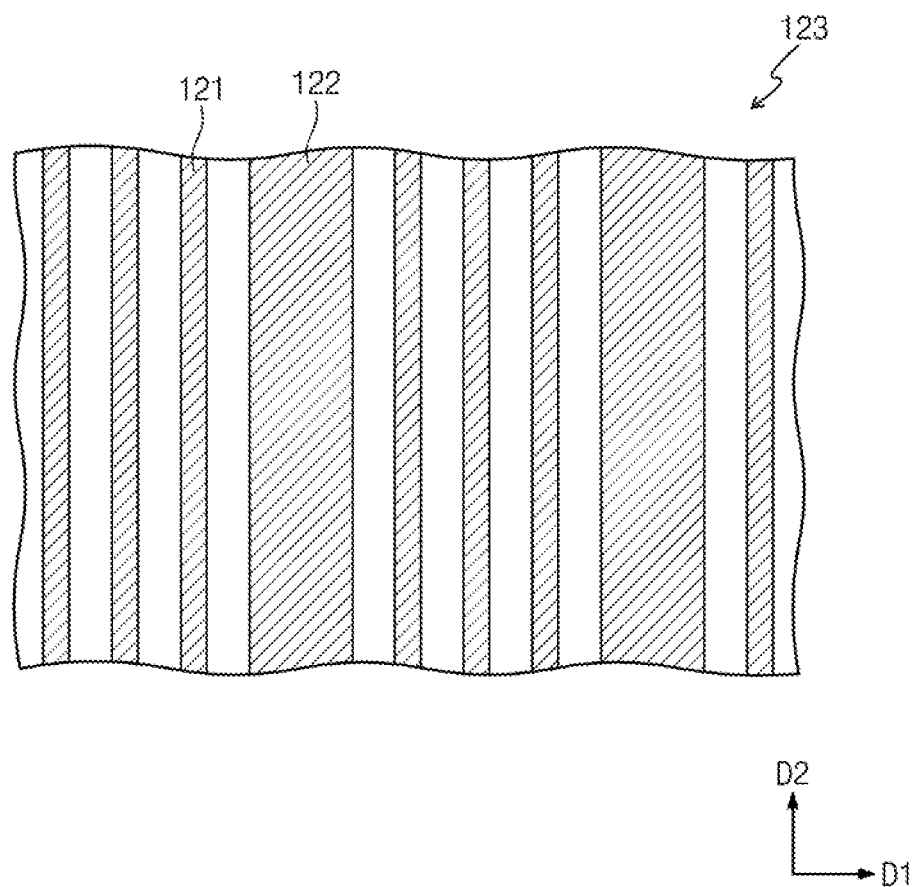
FIG. 3 is a plan view showing a polarization part shown in FIG. 2.

FIG. 2 is a cross-sectional view taken along lines I-I' and II-II' shown in FIG. 2 and FIG. 3 is a plan view showing a polarization part shown in FIG. 2.

Referring to FIGS. 2 and 3, the display cell 100 includes a first substrate 150, a second substrate 180 facing the first substrate 150, and a liquid crystal layer 190 interposed between the first substrate 150 and the second substrate 180.

The first substrate 150 includes, for example, an in-cell reflective polarizer 120, a base insulating layer 130 that covers the in-cell reflective polarizer 120, and a pixel array layer 140 disposed on the base insulating layer 130.

The display cell 100 includes a display area DA and a non-display area NDA. The in-cell reflective polarizer 120 includes, for example, a polarization part 123 disposed on a first transparent substrate 110 to correspond to the display area DA and a reflection part 124 disposed on the first transparent substrate 110 to correspond to the non-display area NDA. The first transparent substrate 110 may be formed of transparent glass, quartz, plastic, or the like. Further, in an exemplary embodiment, the first transparent substrate 110 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof.

The polarization part 123 includes, for example, a plurality of first and second metal nanowires 121 and 122. The first and second metal nanowires 121 and 122 extend, for example, in the second direction D2 to be substantially in parallel to each other and are arranged in the first direction D1 to be spaced apart from each other at predetermined intervals. At least one first metal nanowire 121 is disposed between two second metal nanowires 122 adjacent to each other. The second metal nanowire 122 has a width and a height, which are greater than those of the first metal nanowire 121. As an example, when the width of the first metal nanowire 121 is referred to as "W1" and the width of the second metal nanowire 122 is referred to as "W2", then "W2" is greater than "W1" and has a value equal to or smaller than "2×W1".

For instance, among the first and second metal nanowires 121 and 122, the width of each of the first metal nanowires 121 has the value greater than about zero (0) nm and smaller than about 100 nm (0 nm<W1<100 nm), and thus each first metal nanowire 121 serves as a polarization plate in a visible light range. In this case, the width of each of the second metal nanowires 122 has the value greater than about 80 nm and smaller than about 200 nm (80 nm<W2<200 nm).

As an example, the number of the second metal nanowires 122 may be equal to or smaller than the number of the first metal nanowires 121. That is, an arrangement period of the second metal nanowires 122 may be equal to or greater than an arrangement period of the first metal nanowires 121.

Among the light traveling to the first and second metal nanowires 121 and 122, an S wave, which is a polarizing component substantially in parallel to the direction in which the first and second metal nanowires 121 and 122 extend, is reflected by the first and second metal nanowires 121 and 122, and a P wave, which is a polarizing component substantially perpendicular to the direction in which the first and second metal nanowires 121 and 122 extend, transmits through the first and second metal nanowires 121 and 122.

The reflection part 124 includes a material having high reflectance, e.g., aluminum, and reflects the light provided thereto. When the display cell 100 is assembled with the backlight unit as the display panel, the light reflected by the reflection part 124 is re-reflected by the backlight unit and then is re-incident to the display cell 100. Therefore, the utilization efficiency of the light may be increased by the reflection part 124 of the in-cell reflective polarizer 120.

The base insulating layer 130 is disposed on the in-cell reflective polarizer 120. The base insulating layer 130 covers the polarization part 123 and the reflection part 124.

The pixel array layer 140 is disposed on the base insulating layer 130. The base insulating layer 130 includes an insulating material to electrically insulate the polarization part 123 and the reflection part 124 from the pixel array layer 140.

The pixel array layer 140 includes a thin film transistor TR, an inter-insulating layer 146, and a pixel electrode 147. The pixel electrode 147 may be made of, for example, a transparent conductive material such as indium tin oxide (ITO), indium zinc oxide (IZO), aluminum zinc oxide (AZO), or cadmium tin oxide (CTO). The thin film transistor TR includes a gate electrode 141, a gate insulating layer 142, a semiconductor layer 143, a source electrode 144, and a drain electrode 145.

The gate electrode 141, the source electrode 144, and the drain electrode 145 may each include, for example, aluminum (Al), chromium (Cr), nickel (Ni), molybdenum (Mo), tungsten (W), magnesium (Mg), copper (Cu), titanium (Ti), tantalum (Ta), gold (Au), palladium (Pd), platinum (Pt), neodymium (Nd), zinc (Zn), cobalt (Co), silver (Ag), manganese (Mn) or alloys thereof.

In detail, the gate electrode 141 is disposed on the base insulating layer 130 and covered by the gate insulating layer 142. The gate insulating layer 142 may include, for example, silicon oxide, silicon nitride, silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate ($BaTiO_3$), lead titanate ($PbTiO_3$), or a combination thereof. The semiconductor layer 143 is disposed on the gate insulating layer 142 to correspond to the gate electrode 141, and the source electrode 144 and the drain electrode 145 are disposed on the semiconductor layer 143 to be spaced apart from each other by a predetermined distance. The semiconductor layer 143 may include, for example, amorphous silicon, poly-silicon, or a semiconductor oxide.

The inter-insulating layer 146 is disposed on the gate insulating layer 142 to cover the thin film transistor TR and the pixel electrode 147 is disposed on the inter-insulating layer 146.

FIG. 2 shows the first substrate 150 having the above-mentioned structure as a representative example, but the first substrate 150 should not be limited to the structure shown in FIG. 2.

The second substrate 180 includes, for example, a second transparent substrate 160, a color filter layer 171, and a black matrix 172. The second transparent substrate 160 is disposed to face the first transparent substrate 110 and the black matrix 172 is disposed on the second transparent substrate 160 to correspond to the non-display area NDA. The second transparent substrate 160 may be formed of transparent glass, quartz, plastic, or the like. Further, in an exemplary embodiment, the second transparent substrate 160 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof.

The color filter layer 171 includes red, green, and blue color pixels, and each color pixel corresponds to at least the display area DA and is overlapped with the black matrix 172. However, the color is not limited to the three primary colors of red, green, and blue. Alternatively, for example, in an embodiment, the color filter layer 171 may include the colors of cyan, magenta, and yellow.

The liquid crystal layer 190 is disposed between the first and second substrates 150 and 180, and the display cell 100 further includes a spacer 175 to secure a space in which the liquid crystal layer 190 is formed between the first and second substrates 150 and 180.

In addition, a dichroic polarizer DP is disposed on the display cell 100. The dichroic polarizer DP has a sheet shape and is attached to the display cell 100. The dichroic polarizer DP has a polarizing axis substantially vertical to or substantially in parallel to the direction in which the first and second metal nanowires 121 and 122 of the in-cell reflective polarizer 120 extend.

The align key 300 is disposed on the first transparent substrate 110 to correspond to the first align key area KA1. The align key 300 includes, for example, aluminum as the reflection part 124.

Figure 4A:
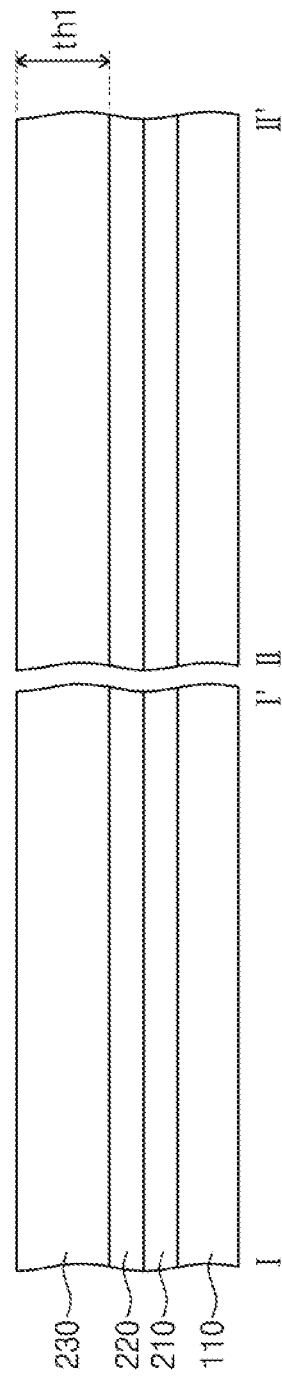
FIGS. 4A to 4Q are cross-sectional views showing a manufacturing method of a mother substrate assembly according to an exemplary embodiment of the present invention.
Figure 4B:
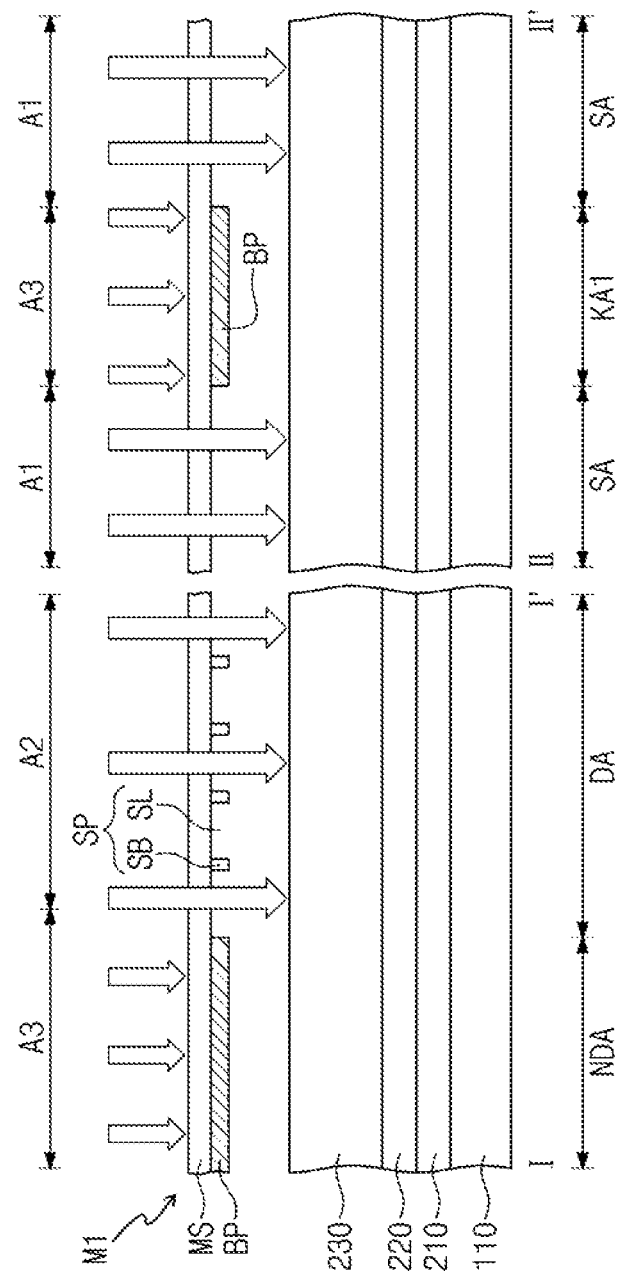
Figure 4G:
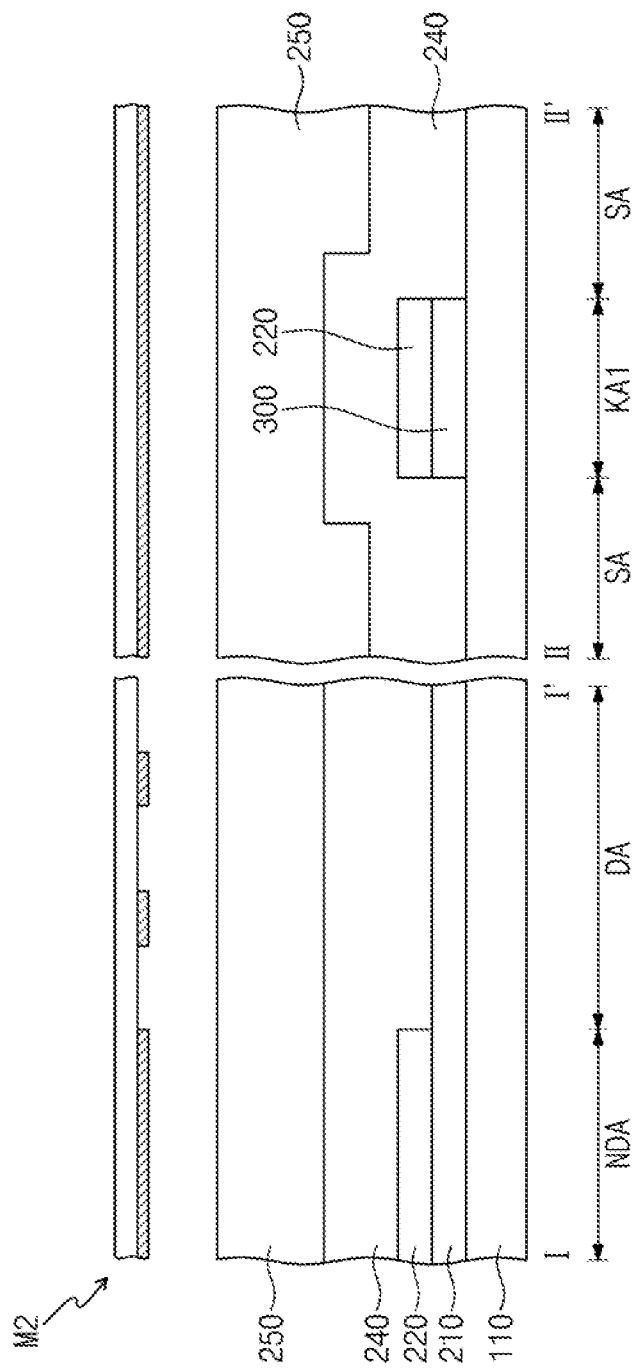
Figure 4H:
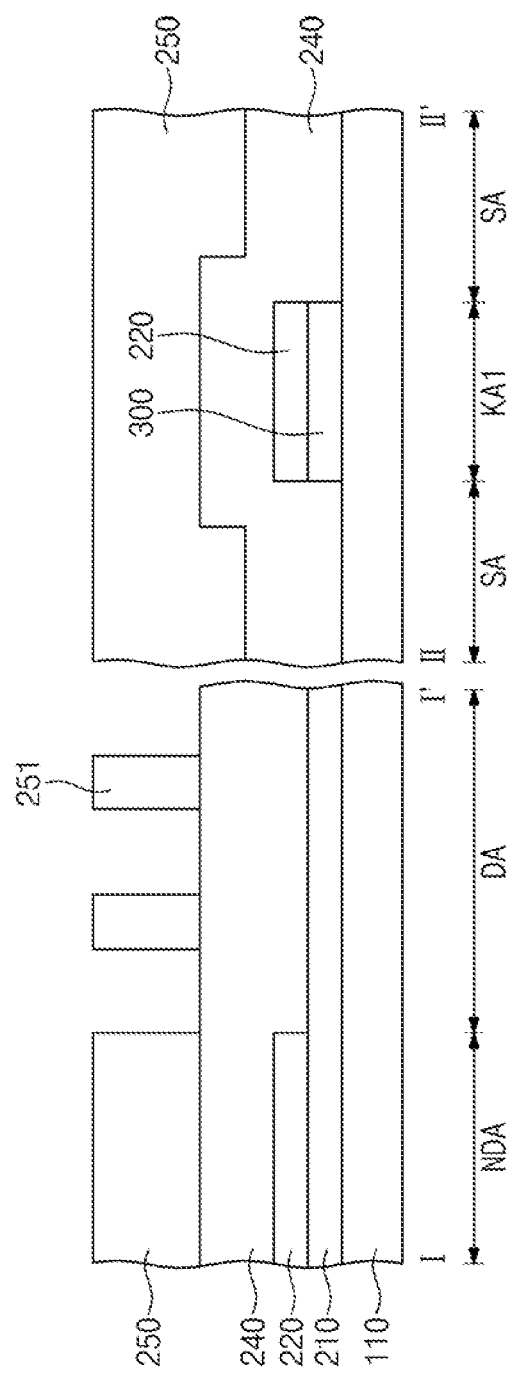
Figure 4K:
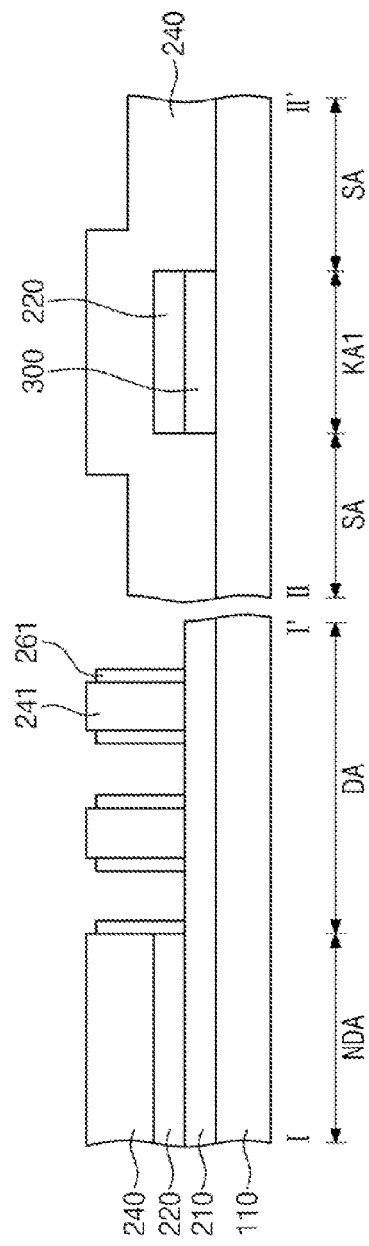
Figure 4L:
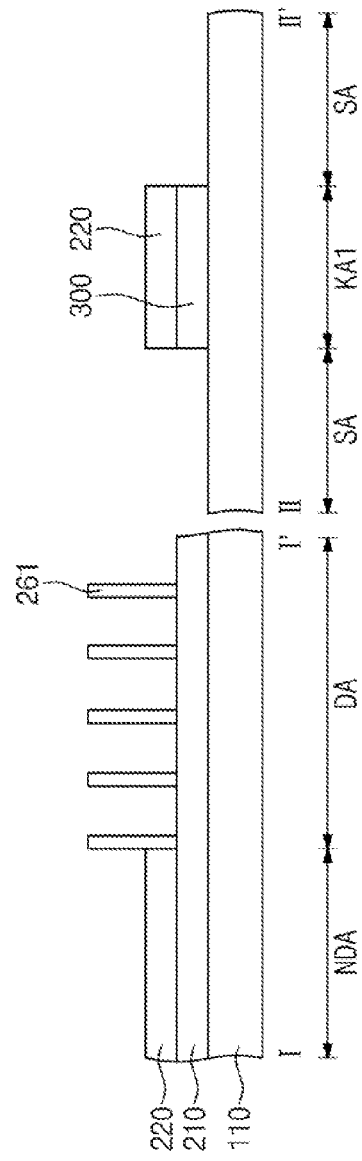
Figure 4M:
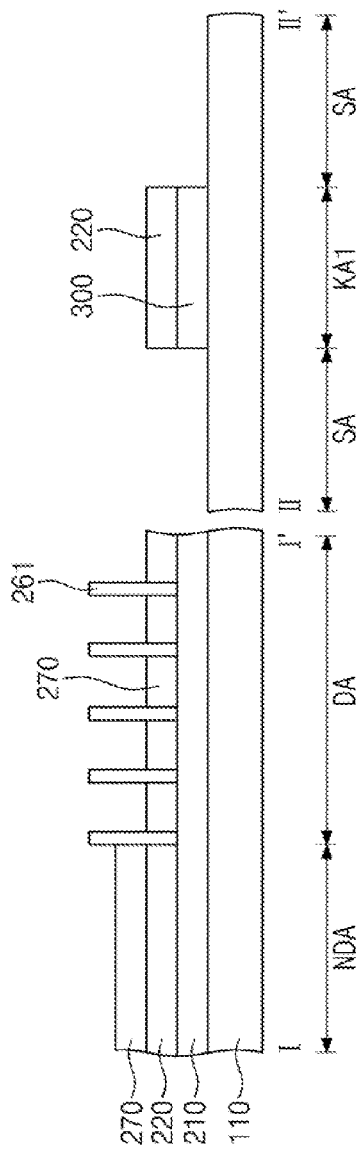
Figure 4N:
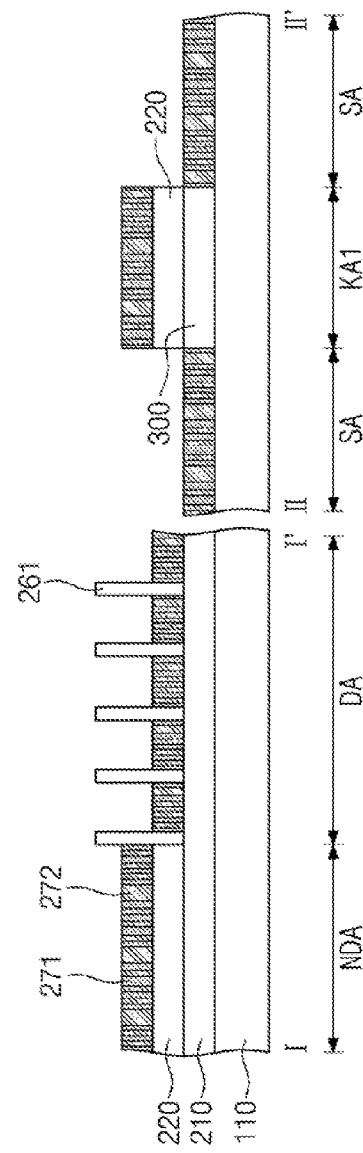
Figure 4P:
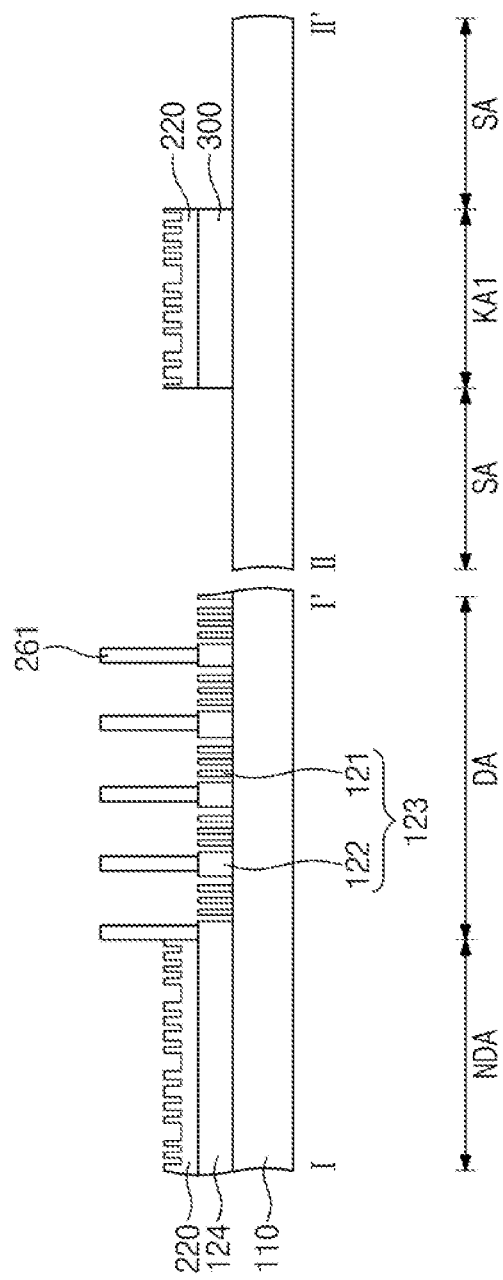
Figure 4Q:
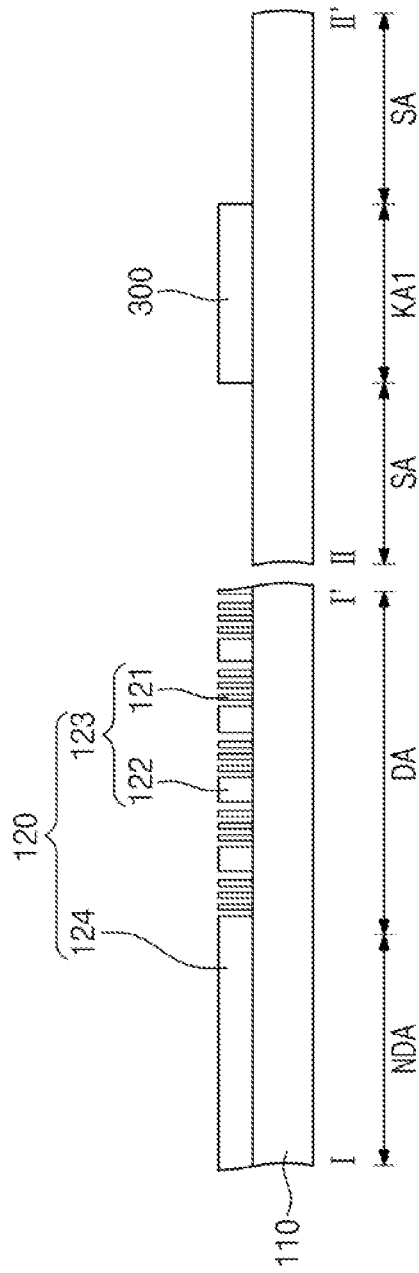

FIGS. 4A to 4Q are cross-sectional views showing a manufacturing method of the mother substrate assembly according to an exemplary embodiment of the present invention. In detail, FIGS. 4A to 4Q are cross-sectional views taken along lines I-I' and II-II' shown in FIG. 1.

Referring to FIG. 4A, a metal layer 210 is formed over the entire surface of the first transparent substrate 110. As an example, the metal layer 210 includes aluminum (Al). The metal layer 210 has a height set by taking the height of the first and second metal nanowires 121 and 122 (refer to FIG. 2) into consideration.

An etch stop layer 220 is formed over the entire surface of the metal layer 210. The etch stop layer 220 includes, for example, chromium, copper, titanium, or indium tin oxide.

A first photoresist layer 230 is formed over the entire surface of the etch stop layer 200. The first photoresist layer 230 has a first thickness th1.

Referring to FIG. 4B, a first mask M1 is disposed above the first photoresist layer 230. The first mask M1 may be a halftone mask, a slit mask, or a binary mask. Hereinafter, the slit mask M1 will be described as the first mask M1. The first mask M1 includes, for example, a mask substrate MS, a light blocking part BP, and a plurality of slit parts SP.

The first mask M1 includes, for example, first, second, and third areas A1, A2, and A3. The first and second areas A1 and A2 respectively correspond to the substrate area SA and the display area DA. The third area A3 corresponds to the non-display area NDA and the first align key area KA1. The light blocking part BP is disposed on the mask substrate MS to correspond to the third area A3 and the slit part SP is disposed on the mask substrate MS to correspond to the second area A2. The light blocking part BP includes a light blocking material to block the light incident thereto. The slit part SP includes a plurality slit bars SB disposed spaced apart from each other at a predetermined distance and a plurality of slits SL defined by the space inbetween the slit bars SB. The slit bars SB, as an example, can be formed from the blocking material. A portion of a light incident to the slit part SP is blocked by the slit bars SB and remaining portion of the incident light is transmitted through the slits SL. Therefore, the intensity of the light transmitted the slit part decreases. The slit part SP reduces an intensity of the light incident thereto. As the light blocking material is not provided to the first area A1, the light traveling to the first area A1 transmits through the first mask M1. Thus, a first transmittance of the first area A1 is higher than a second transmittance of the second area A2, and the second transmittance is higher than a third transmittance of the third area A3.

The first photoresist layer 230 is exposed to the light through the first mask M1. In more detail, when the light is irradiated onto an upper surface of the first mask M1, the light traveling to the first area A1 transmits through the first mask M1, and thus the first photoresist layer 230 in the substrate area SA is fully exposed by the light. In addition, the light traveling to the slit part SP transmits through the first mask M1 after the intensity of the light is reduced by the slit part SP, so that the first photoresist layer 230 in the display area DA is under-exposed by the light. Further, as the light traveling to the light blocking part BP is blocked by the light blocking part BP, the first photoresist layer 230 in the non-display area NDA and the first align key area KA1 is not exposed. Here, the term of "fully exposed" used herein means that the first photoresist layer 230 is exposed by the light having the intensity equal to or greater than an optimal exposure energy to completely expose the photoresist layer 230 in a thickness direction of the first photoresist layer 230, and the term of "under-exposed" used herein means that the first photoresist layer 230 is exposed by the light having the intensity smaller than the optimal exposure energy.

Referring to FIG. 4C, a development process is performed on the first photoresist layer 230. As the first photoresist layer 230 is fully exposed in the substrate area SA, the first photoresist layer 230 disposed in the substrate area SA is completely removed. As a result, an upper surface of the etch stop layer 220 is exposed to the outside in the substrate area SA. As the first photoresist layer 230 is under-exposed in the display area DA, the first photoresist layer 230 is partially removed from the upper surface thereof in the display area DA such that a sub-photoresist layer 232 is formed. The sub-photoresist layer 232 has a second thickness th2 thinner than the first thickness th1. As the first photoresist layer 230 disposed in the non-display area NDA and the first align key area KA1 is not exposed to the light, the first photoresist layer 230 is not removed in the non-display area NDA and the first align key area KA1. As a result, a main photoresist layer 231 is formed in the non-display area NDA and the first align key area KA1 to have the first thickness th1.

Referring to FIG. 4D, the etch stop layer 220 and the metal layer 210 are removed in the substrate area SA. Accordingly, the upper surface of the first transparent substrate 110 is exposed to the outside in the substrate area SA. The metal layer 210 remains in the first align key area KA1 without being removed. Therefore, the align key 300 is formed in the first align key area KA1 by the metal layer 210.

Referring to FIG. 4E, the sub-photoresist layer 232 is etched. Then, the etch stop layer 220 is removed in the display area DA. When the sub-photoresist layer 232 is etched, the main photoresist layer 231 is etched together with the sub-photoresist layer 232. Thus, the main photoresist layer 231 has a third thickness th3 thinner than the first thickness th1.

Referring to FIG. 4F, a stripping process is performed to remove the main photoresist layer 231. Then, a sacrificial layer 240 is formed on the first transparent substrate 110 to have a predetermined thickness. The sacrificial layer 240 covers the etch stop layer 220, the metal layer 210, and the first transparent substrate 110.

Referring to FIG. 4G, a second photoresist layer 250 is formed on the sacrificial layer 240. A second mask M2 is disposed above the second photoresist layer 250. The second photoresist layer 250 is patterned by a photolithography process using the second mask M2.

When the second photoresist layer 250 is patterned by the photolithography process using the second mask M2, a photomask 251 is formed on the sacrificial layer 240 in the display area DA, as shown in FIG. 4H. As an example, the photomask 251 may extend in a direction substantially in parallel to two sides parallel to each other among four sides of the first transparent substrate 110.

Referring to FIG. 4I, a portion of the sacrificial layer 240, which is not covered by the photomask 251 and the second photoresist layer 250, is, for example, dry-etched to form bar patterns 241 in the display area DA. Then, the photomask 251 and the second photoresist layer 250 are removed.

Each of the bar patterns 241 has a width Wa determined depending on a width of the photomask 251. In addition, a sidewall of each of the bar patterns 241 has an inclination angle from about 80 degrees to about 95 degrees. The width Wa of each of the bar patterns 241 may be smaller than a distance d1 between two bar patterns 241 adjacent to each other.

Referring to FIG. 4J, a barrier layer 260 is formed on the first transparent substrate 110. The barrier layer 260 covers the sacrificial layer 240, the bar patterns 241, and the metal layer 210. Then, when an anisotropic etching process is performed on the barrier layer 260, barrier walls 261 are disposed along the bar patterns 241 and formed in the display area DA to be spaced apart from each other by predetermined intervals as shown in FIG. 4K As an example, the anisotropic etching process is performed along a direction substantially vertical to the surface of the first transparent substrate 110. Accordingly, a portion of the barrier layer 260, which is substantially in parallel to the surface of the first transparent substrate 110, is removed by the anisotropic etching process, and a portion of the barrier layer 260, which is substantially vertical to the surface of the first transparent substrate 110, is not removed.

Therefore, the barrier walls 261 may be formed along the bar patterns 241.

Here, an etch selectivity of the sacrificial layer 240 is greater than that of the barrier layer 260. The etch selectivity of the sacrificial layer 240 may be, for example, two times greater than that of the barrier layer 260. For example, in the present exemplary embodiment, the sacrificial layer 240 includes silicon nitride and the barrier layer 260 includes silicon oxide.

In this case, the bar patterns 241 formed using the sacrificial layer 240 remain without being etched while the barrier layer 260 is anisotropically etched.

After that, when the bar patterns 241 are etched, only the barrier layers 261 are formed on the metal layer 210 in the display area DA to be spaced apart from each other at predetermined intervals as shown in FIG. 4L. As an example, each of the barrier layers 261 has a width from about 80 nm to about 200 nm.

The sacrificial layer 240 and the barrier layer 260 are formed of a material having different etch selectivity from the metal layer 210. That is, the sacrificial layer 240 and the barrier layer 260 are formed of a material that allows the metal layer 210 not to be etched when the bar patterns 241 and the barrier layer 260 are etched.

Referring to FIG. 4M, a copolymer layer 270 is formed on the first transparent substrate 110. The copolymer layer 270 covers the etch stop layer 220, the metal layer 210, and the first transparent substrate 110. Spaces between the barrier walls 261 in the display area DA are filled with the copolymer layer 270. The copolymer layer 270 has a height smaller than that of each of the barrier walls 261. As an example, the copolymer layer 270 includes a first polymer and a second polymer, which are arranged in irregular directions. The first and second polymers may be, for example, a copolymer including polystyrene and polymethylmethacrylate (PMMA), respectively.

When the copolymer layer 270 is heat-treated, the copolymer layer 270 is phase-separated into the first and second polymers 271 and 272 as shown in FIG. 4N. However, the treatment of the copolymer layer 270 should not be limited thereto or thereby. For instance, the copolymer layer 270 may be treated with solvent-annealed. The solvent-annealed copolymer layer 270 is also phase-separated into the first and second polymers 271 and 272 as shown in FIG. 4N.

For example, the first and second polymers 271 and 272 are alternately arranged between two barrier walls 261 in accordance with a uniform period in the display area DA. On the contrary, the first and second polymers 271 and 272 are arranged, for example, in irregular directions in the non-display area NDA, the substrate area SA, and the first align key area KA1.

Referring to FIG. 4O, one of the first and second polymers 271 and 272 is removed. That is, the first polymer 271 or the second polymer 272 remains between the two barrier walls in the display area DA to form a nano-grid pattern 273. In the present exemplary embodiment, the second polymer 272 including the PMMA is removed and the first polymer 271 remains to form the nano-grid pattern 273.

Then, the metal layer 210 is etched using the nano-grid pattern 273 and the barrier walls 261 in the display area DA. Therefore, the first and second metal nanowires 121 and 122, which are uniformly arranged, are formed on the first transparent substrate 110 in the display area DA as shown in FIG. 4P. The polarization part 123 is formed by the first and second metal nano-wires 121 and 122.

The metal layer 210, which is covered by the etch stop layer 220, remains in the non-display area NDA without being etched. Thus, the reflection part 124 is formed by the metal layer 210 remaining in the non-display area NDA.

Referring to FIG. 4Q, the etch stop layer 220 disposed on the reflection part 124 and the align key 300 is removed. Consequently, the in-cell reflective polarizer 120, which includes the reflection part 124 disposed in the non-display area NDA and the polarization part 123 disposed in the display area DA, is formed on the first transparent substrate 110, and the align key 300 is formed in the first align key area KA1.

In addition, according to the manufacturing method of the mother substrate assembly of the present exemplary embodiment, the in-cell reflective polarizer 120 and the align key 300 may be formed using only two masks, i.e., the first mask M1 (refer to FIG. 4B) and the second mask M2 (refer to FIG. 4G). Accordingly, the number of the masks used to manufacture the mother substrate assembly may be reduced.

Figure 5A:
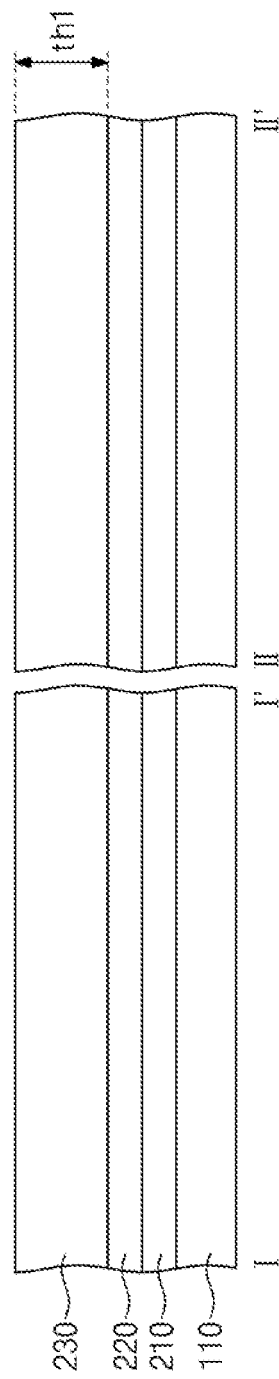
FIGS. 5A to 5S are cross-sectional views showing a manufacturing method of a mother substrate assembly according to an exemplary embodiment of the present invention.
Figure 5B:
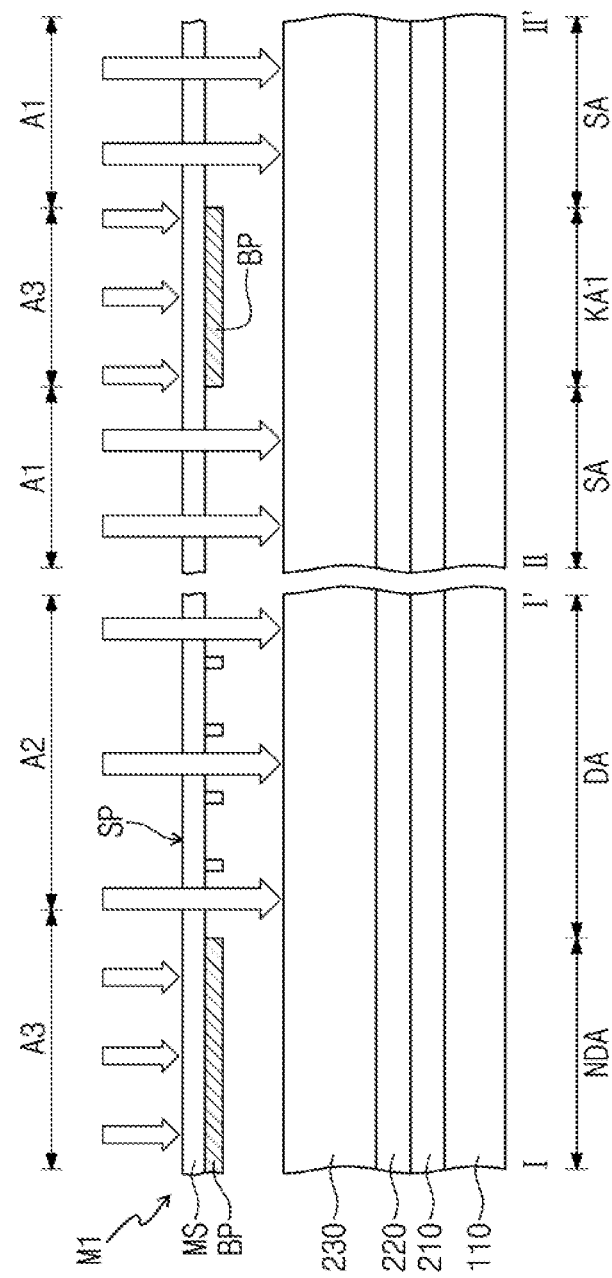
Figure 5F:
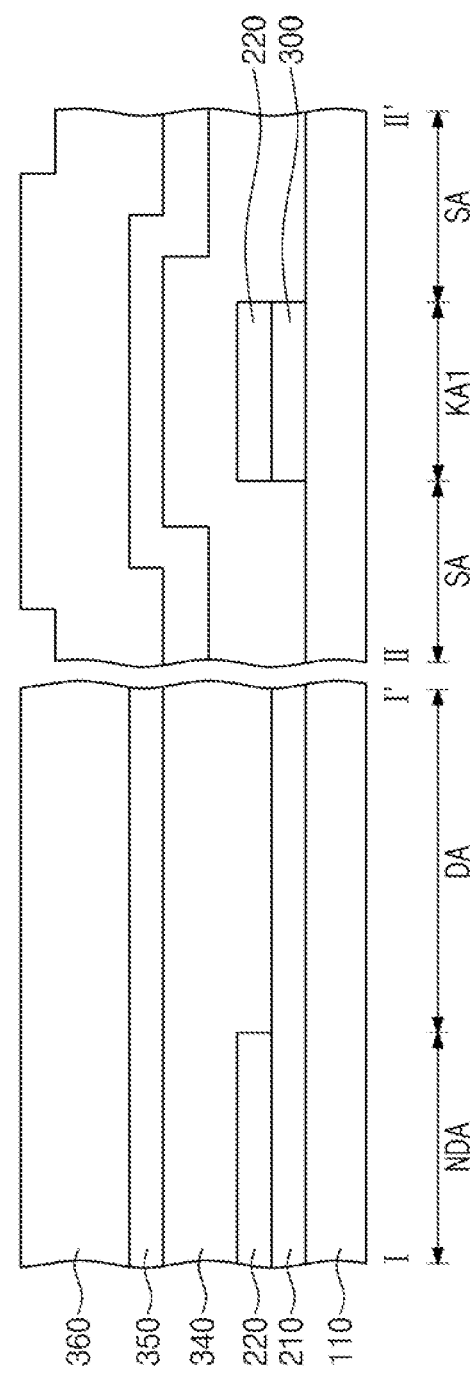
Figure 5G:
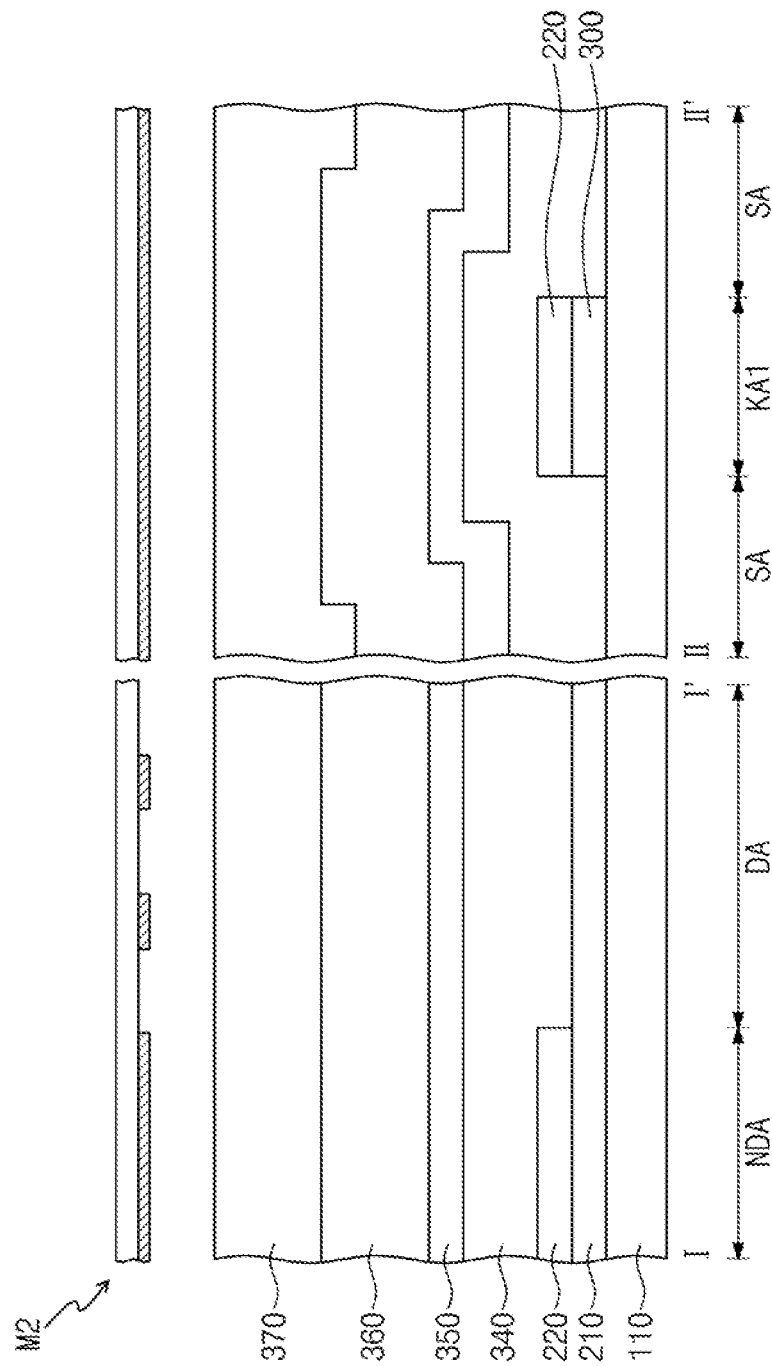
Figure 5H:
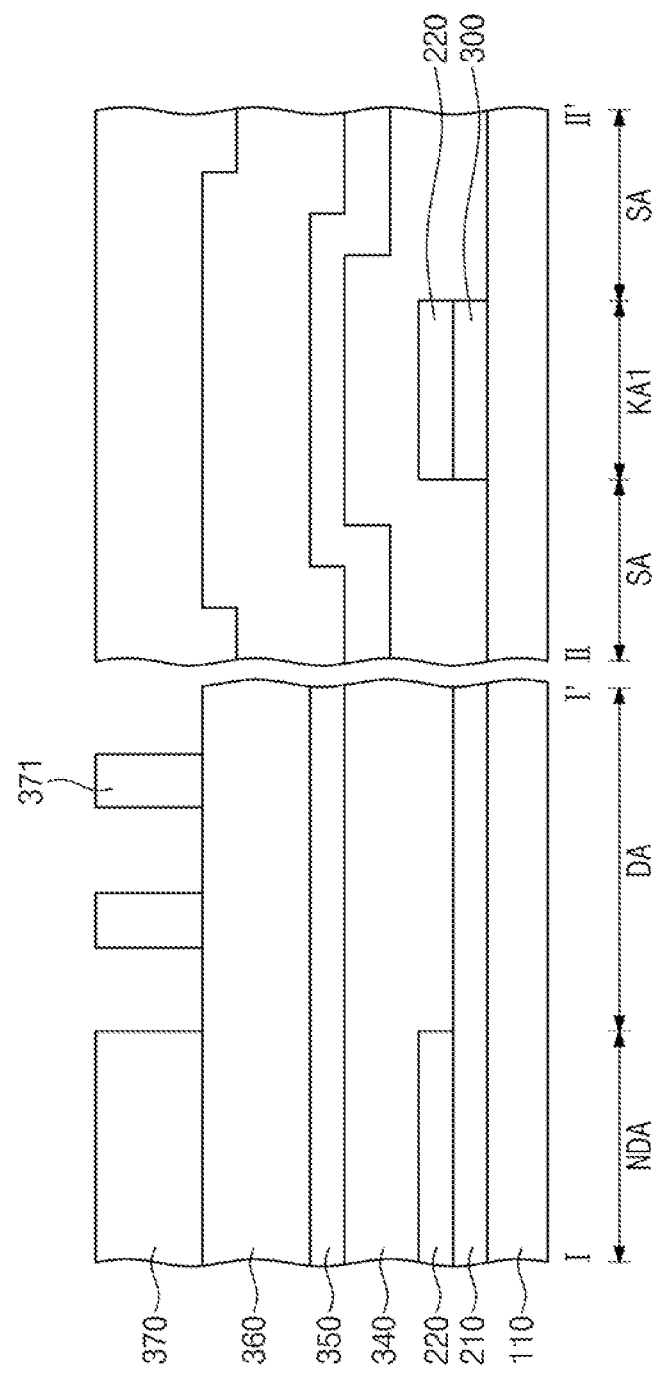
Figure 5J:
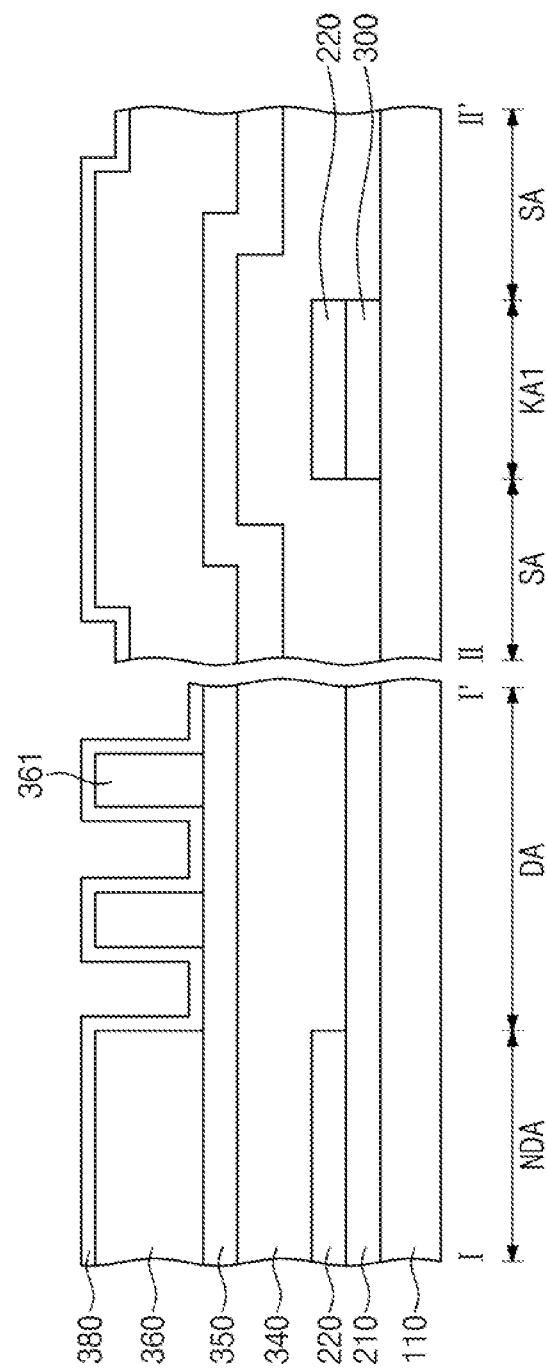
Figure 5K:
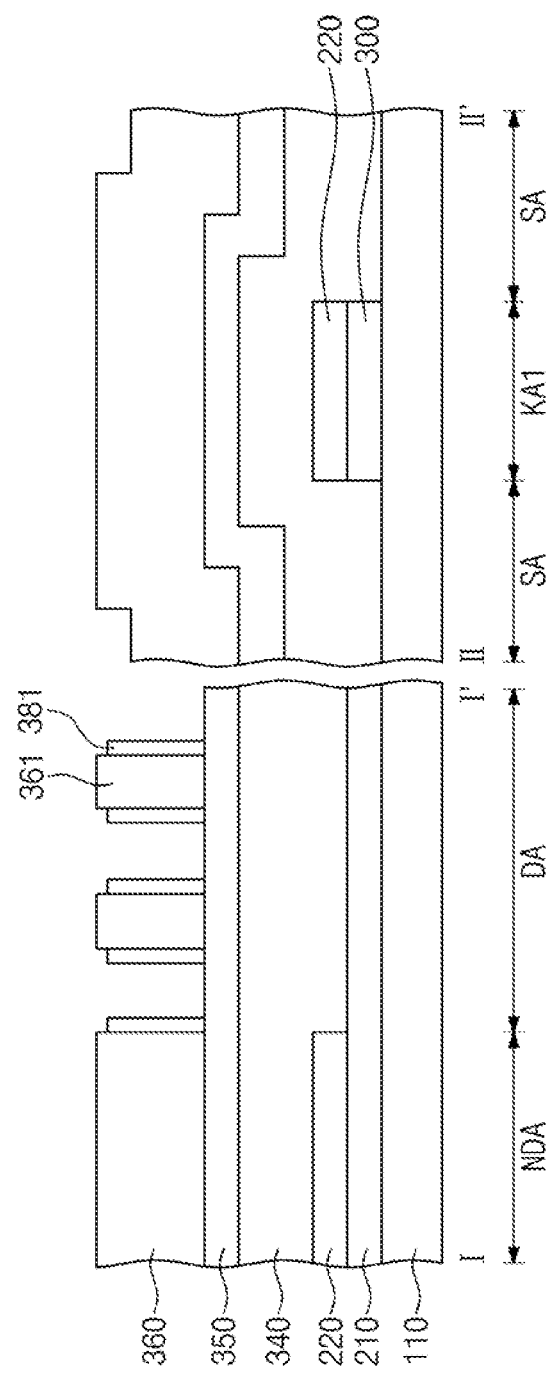
Figure 5L:
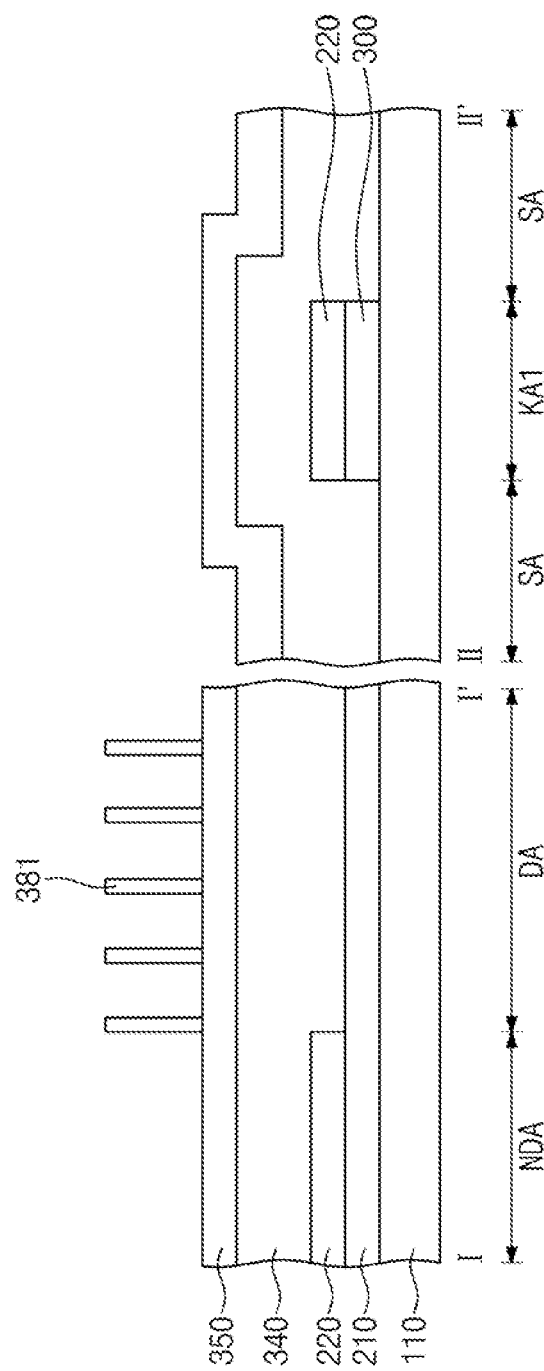
Figure 5O:
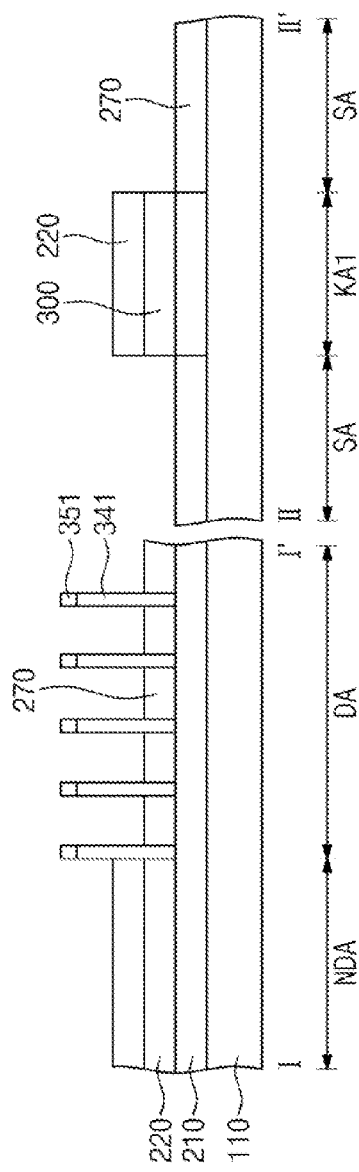
Figure 5P:
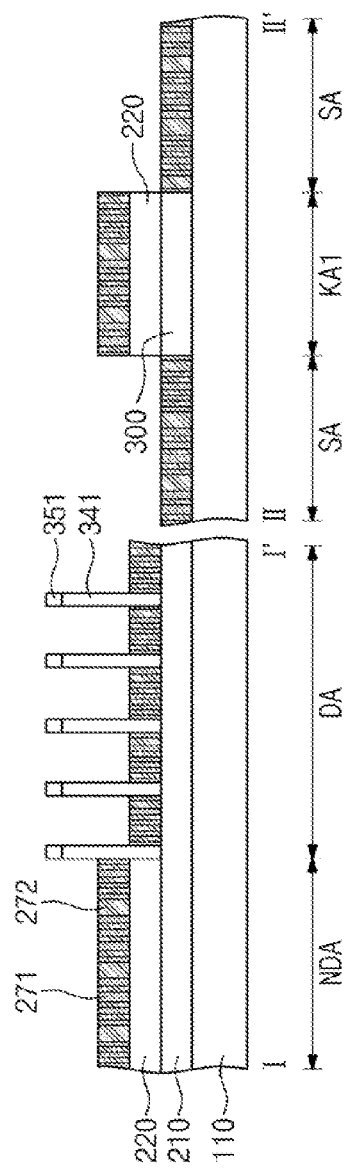
Figure 5S:
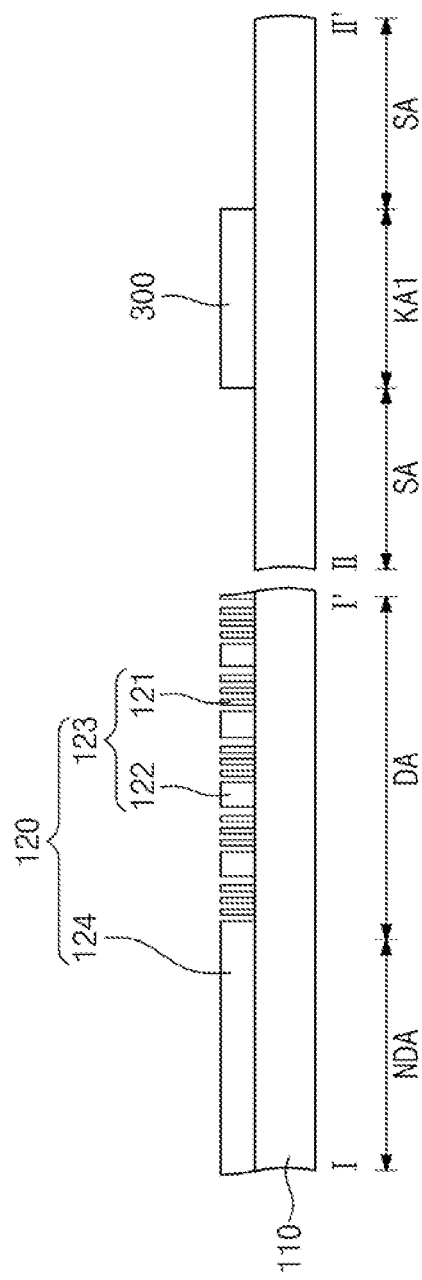

FIGS. 5A to 5S are cross-sectional views showing a manufacturing method of a mother substrate assembly according to an exemplary embodiment of the present invention. In detail, FIGS. 5A to 5S are cross-sectional views taken along lines I-I' and II-II' shown in FIG. 1.

Referring to FIG. 5A, a metal layer 210 is formed over the entire surface of the first transparent substrate 110. As an example, the metal layer 210 includes aluminum (Al). The metal layer 210 has a height set by taking the height of the first and second metal nanowires 121 and 122 (refer to FIG. 2) into consideration.

An etch stop layer 220 is formed over the entire surface of the metal layer 210. The etch stop layer 220 includes, for example, chromium, copper, titanium or indium tin oxide.

A first photoresist layer 230 is formed over the entire surface of the etch stop layer 200. The first photoresist layer 230 has a first thickness th1.

Referring to FIG. 5B, a first mask M1 is disposed above the first photoresist layer 230. The first photoresist layer 230 is exposed to the light through the first mask M1. In more detail, when the light is irradiated onto the upper surface of the first mask M1, the light traveling to the first area A1 transmits through the first mask M1, and thus the first photoresist layer 230 in the substrate area SA is fully exposed by the light. In addition, the light traveling to the slit part SP transmits through the first mask M1 after the intensity of the light is reduced by the slit part SP, so that the first photoresist layer 230 in the display area DA is underexposed by the light. Further, as the light traveling to the light blocking part BP is blocked by the light blocking part BP, the first photoresist layer 230 in the non-display area NDA and the first align key area KA1 is not exposed.

Referring to FIG. 5C, a development process is performed on the first photoresist layer 230. As the first photoresist layer 230 is fully exposed in the substrate area SA, the first photoresist layer 230 disposed in the substrate area SA is completely removed. As a result, an upper surface of the etch stop layer 220 is exposed to the outside in the substrate area SA.

In addition, as the first photoresist layer 230 is underexposed in the display area DA, the first photoresist layer 230 is partially removed from the upper surface thereof in the display area DA such that a sub-photoresist layer 232 is formed. Therefore, the sub-photoresist layer 232 has a second thickness th2 thinner than the first thickness th1. As the first photoresist layer 230 disposed in the non-display area NDA and the first align key area KA1 is not exposed to the light, the first photoresist layer 230 remains without being etched. As a result, a main photoresist layer 231 is formed by the first photoresist layer 230 remaining in the non-display area NDA and the first align key area KA1 to have the first thickness th1.

Referring to FIG. 5D, the etch stop layer 220 and the metal layer 210 are removed in the substrate area SA by etching. Accordingly, the upper surface of the first transparent substrate 110 is exposed to the outside in the substrate area SA. The metal layer 210 remains in the first align key area KA1 without being removed. Therefore, the align key 300 is formed in the first align key area KA1 by the metal layer 210.

Referring to FIG. 5E, the sub-photoresist layer 232 is etched. Then, the etch stop layer 220 is removed in the display area DA. When the sub-photoresist layer 232 is etched, the main photoresist layer 231 is etched together with the sub-photoresist layer 232. Thus, the main photoresist layer 231 has a third thickness th3 thinner than the first thickness th1.

Referring to FIG. 5F, a stripping process is performed to remove the main photoresist layer 231. Then, a first barrier layer 340 is formed on the first transparent substrate 110 to cover the etch stop layer 220, the metal layer 210, and the first transparent substrate 110. A hard mask layer 350 and a sacrificial layer 360 are sequentially formed over the entire surface of the first barrier layer 340.

Referring to FIG. 5G, a second photoresist layer 370 is formed on the sacrificial layer 360. A second mask M2 is disposed above the second photoresist layer 370. The second photoresist layer 370 is patterned by a photolithography process using the second mask M2.

When the second photoresist layer 370 is patterned by the photolithography process using the second mask M2, a photomask 371 is formed on the sacrificial layer 360 in the display area DA as shown in FIG. 5H. As an example, the photomask 371 may extend in a direction substantially in parallel to two sides parallel to each other among four sides of the first transparent substrate 110.

Referring to FIG. 5I, a portion of the sacrificial layer 360, which is not covered by the photomask 371 and the second photoresist layer 370, is, for example, dry-etched to form bar patterns 361 in the display area DA. Then, the photomask 371 and the second photoresist layer 370 are removed.

Each of the bar patterns 361 has a width Wa determined depending on a width of the photomask 371. In addition, a sidewall of each of the bar patterns 361 has an inclination angle θ from about 80 degrees to about 95 degrees. The width Wa of each of the bar patterns 361 may be smaller than a distance dl between two bar patterns 361 adjacent to each other.

Referring to FIG. 5J, a second barrier layer 380 is formed on the first transparent substrate 110. The second barrier layer 380 covers the sacrificial layer 360, the bar patterns 361, and the hard mask layer 350. Then, when an anisotropic etching process is performed on the second barrier layer 380, first barrier walls 381 are disposed along the bar patterns 361 and formed in the display area DA to be spaced apart from each other by predetermined intervals as shown in FIG. 5K.

Here, an etch selectivity of the sacrificial layer 360 is greater than that of the second barrier layer 380. The etch selectivity of the sacrificial layer 360 may be, for example, two times greater than that of the second barrier layer 380. For example, in the present exemplary embodiment, the sacrificial layer 360 includes silicon nitride and the second barrier layer 380 includes silicon oxide.

In this case, the bar patterns 361 formed using the sacrificial layer 360 remain without being etched while the second barrier layer 380 is anisotropically etched.

After that, when the bar patterns 361 are etched, only the first barrier walls 381 are formed on the hard mask layer 350 in the display area DA to be spaced apart from each other at predetermined intervals as shown in FIG. 5L. As an example, each of the first barrier walls 381 has a width from about 80 nm to about 200 nm.

The sacrificial layer 360 and the second barrier layer 380 are formed of a material having different etch selectivity from the hard mask layer 350. That is, the sacrificial layer 360 and the second barrier layer 380 are formed of a material that allows the hard mask layer 350 not to be etched when the bar patterns 361 and the second barrier layer 380 are etched.

When the hard mask layer 350 is etched using the first barrier walls 381 as the mask, second barrier walls 351 are formed on the first barrier layer 340 as shown in FIG. 5M. The second barrier walls 351 are formed to respectively correspond to the first barrier walls 381. The first barrier walls 381 may be removed while the hard mask layer 350 is etched.

The hard mask layer 350 includes a material having the etch selectivity greater than that of the first barrier layer 340. As an example, the hard mask layer 350 includes aluminum and the first barrier layer 340 includes silicon nitride.

When the first barrier layer 340 is etched using the second barrier walls 351 as the mask, third barrier walls 341 are formed as shown in FIG. 5N. The third barrier walls 341 are formed to respectively correspond to the second barrier walls 351. The second barrier walls 351 may be partially removed while the first barrier layer 340 is etched, and thus the height of the second barrier walls 351 disposed on the third barrier walls 341 becomes lower.

Referring to FIG. 5O, a copolymer layer 270 is formed on the first transparent substrate 110. The copolymer layer 270 covers the etch stop layer 220, the metal layer 210, and the first transparent substrate 110. Spaces between the third barrier walls 341 in the display area DA are filled with the copolymer layer 270. The copolymer layer 270 has a height smaller than that of each of the third barrier walls 341. As an example, the copolymer layer 270 includes a first polymer and a second polymer, which are arranged in irregular directions. The first and second polymers may be, for example, a copolymer including polystyrene and polymethylmethacrylate (PMMA), respectively.

When the copolymer layer 270 is heat-treated, the copolymer 270 is phase-separated into the first and second polymers 271 and 272 as shown in FIG. 5P. However, the treatment of the copolymer layer 270 should not be limited thereto or thereby. For instance, the copolymer layer 270 may be treated with solvent-annealed. The solvent-annealed copolymer layer 270 is also phase-separated into the first and second polymers 271 and 272 as shown in FIG. 5P.

For example, the first and second polymers 271 and 272 are alternately arranged between two third barrier walls 341 in the display area DA. On the contrary, the first and second polymers 271 and 272 are arranged, for example, in irregular directions in the non-display area NDA, the substrate area SA, and the first align key area KA1.

Referring to FIG. 5Q, one of the first and second polymers 271 and 272 is removed. That is, the first polymer 271 or the second polymer 272 remains between the two third barrier walls 341 in the display area DA to form a nano-grid pattern 273. In the present exemplary embodiment, the second polymer 272 including the PMMA is removed and the first polymer 271 remains to form the nano-grid pattern 273.

Then, the metal layer 210 is etched using the nano-grid pattern 273 and the third barrier walls 341 in the display area DA. Therefore, the first and second metal nanowires 121 and 122, which are uniformly arranged, are formed on the first transparent substrate 110 in the display area DA as shown in FIG. 5R. The polarization part 123 is formed by the first and second metal nano-wires 121 and 122.

The metal layer 210, which is covered by the etch stop layer 220, remains in the non-display area NDA without being etched. Thus, the reflection part 124 is formed by the metal layer 210 remaining in the non-display area NDA.

Referring to FIG. 5S, the etch stop layer 220 disposed on the reflection part 124 and the align key 300 is removed. Consequently, the in-cell reflective polarizer 120, which includes the reflection part 124 disposed in the non-display area NDA and the polarization part 123 disposed in the display area DA, is formed on the first transparent substrate 110, and the align key 300 is formed in the first align key area KA1.

According to the manufacturing method of the mother substrate assembly of the present exemplary embodiment, the in-cell reflective polarizer 120 and the align key 300 may be formed using only two masks, i.e., the first and second masks M1 and M2. Accordingly, the number of the masks used to manufacture the in-cell reflective polarizer 120 and the align key 300 may be reduced.

In the above-mentioned description, the metal layer 210 is removed in the substrate area SA and remains in the first align key area KA1, and thus the align key is formed by the remaining metal layer 210, but the forming method of the align key should not be limited thereto or thereby. For instance, in a case that the metal layer 210 remains in the substrate area SA and is removed in the first align key area KA1, the metal layer 210 is removed in the first align key area KA1 and the align key 300 is formed by the opening portions.

Figure 6:
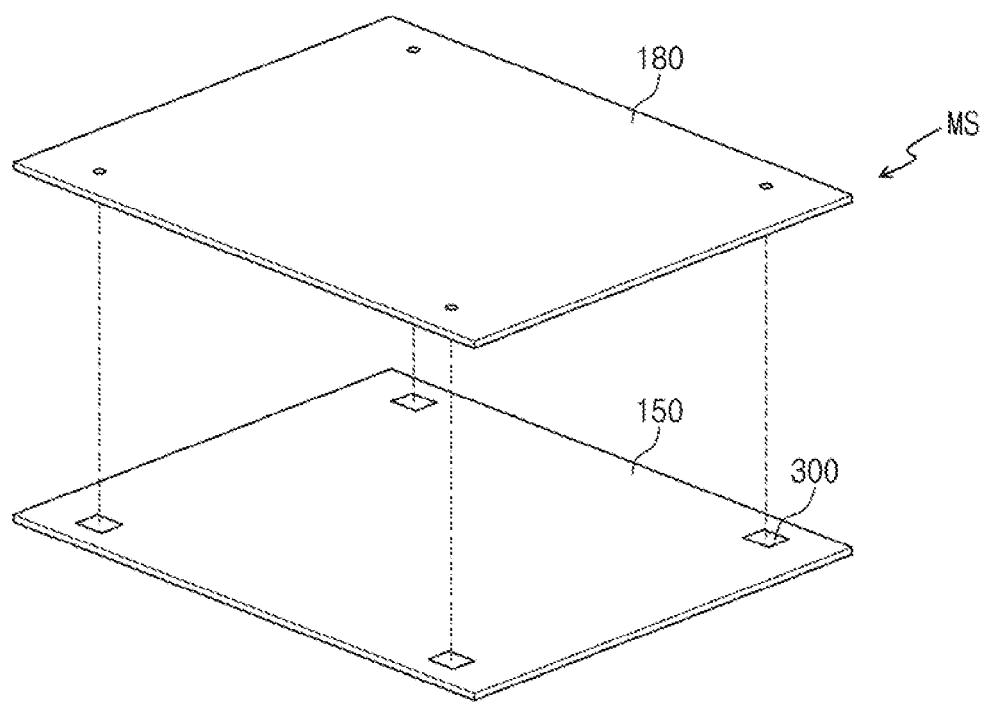
FIG. 6 is a perspective view showing a process of coupling first and second substrates.

FIG. 6 is a perspective view showing a process of coupling the first and second substrates.

Referring to FIG. 6, the second substrate 180 is coupled to the first substrate 150. The second substrate 180 is aligned to the first substrate 150 with reference to the align key 300. Accordingly, the second substrate 180 may be accurately aligned to the first substrate 150 while being coupled to the first substrate 150.

Having described example embodiments of the present invention, it is further noted that it is readily apparent to those of ordinary skill in the art that various modifications may be made without departing from the spirit and scope of the invention which is defined by the metes and bounds of the appended claims.

What is claimed is:

1. A method of manufacturing a mother substrate assembly, comprising:
   forming a metal layer on substantially an entire surface of a transparent substrate including a cell area including a non-display area and a display area, an align key area, and a substrate area surrounding the cell area and the align key area;
   etching the metal layer to form an align key in the align key area;
   etching the metal layer to form a reflection part in the non-display area; and
   etching the metal layer in the display area to form a polarization part including metal nanowires in the display area.

2. The method of claim 1, wherein the forming of the align key comprises etching the metal layer in the substrate area.

3. The method of claim 2, wherein the forming of the align key comprises etching the metal layer in the align key area.

4. The method of claim 2, further comprising forming a single photoresist layer on the metal layer and exposing the single photoresist layer in the align key area and the non-display area prior to the etching of the metal layer in the align key area and the non-display area.

5. The method of claim 1, wherein the Metal nanowires are extended in a first direction and are arranged in a second direction crossing the first direction to be spaced apart from each other.

6. A method of manufacturing a mother substrate assembly, comprising:
   forming a metal layer on substantially an entire surface of a transparent substrate including a cell area including a non-display area and a display area, an align key area, and a substrate area surrounding the cell area and the align key area;
   forming a photoresist layer on substantially an entire surface of the metal layer, the photoresist layer comprises a first portion which overlaps the substrate area and a second portion which overlaps the display area;
   exposing the first portion to a first light to remove the first portion;
   exposing the second portion to a second light different from the first light to reduce a thickness of the second portion;
   etching the metal layer in the substrate area to form an align key in the align key area;
   removing the second portion exposed to the second light; and
   etching the metal layer to form a reflective polarizer in the cell area.

7. The method of claim 6, wherein an intensity of the first light is greater than an intensity of the second light.

8. The method of claim 6, further comprising forming an etch stop layer on substantially the entire surface of the metal layer, wherein the etch stop layer is disposed between the metal layer and the photoresist layer.

9. The method of claim 8, wherein the etching the metal layer in the substrate area comprises removing the etch stop layer and the metal layer in the substrate area to form the align key in the align key area.

10. The method of claim 8, wherein the reflective polarizer is in-cell reflective polarizer which comprises a metal nanowire and a reflection part, and the metal nanowire overlaps the display area and the reflection part overlaps the non-display area.

11. The method of claim 8, further comprising removing the etch stop layer in the display area.

12. The method of claim 6, further comprising removing the photoresist layer in the non-display area and the align key area.

13. The method of claim 6, wherein the reflective polarizer is formed after forming the align key.

14. The method of claim 6, wherein the exposing the first portion to the first light and the exposing the second portion to the second light are performed by using a mask, and the mask comprises a first area corresponding to the substrate area, a second area corresponding to the display area, and a third area corresponding to the non-display area and the align key area, wherein the first area has a first transmittance higher than a second transmittance of the second area, and the second transmittance is higher than a third transmittance of the third area.

15. The method of claim 14, wherein the mask is at least one of a halftone mask, a slit mask, or a binary mask.

* * * * *